(12) United States Patent
Karaoguz et al.

(10) Patent No.: US 9,924,362 B2
(45) Date of Patent: *Mar. 20, 2018

(54) PROVIDING ACCESS DEPENDENT SERVICES VIA A BROADBAND ACCESS GATEWAY

(71) Applicant: Broadcom Corporation, Irvine, CA (US)

(72) Inventors: Jeyhan Karaoguz, Irvine, CA (US); Marc Abrams, Aliso Viejo, CA (US); Nambirajan Seshadri, Irvine, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 161 days.

This patent is subject to a terminal disclaimer.

(21) Appl. No.: 14/620,867

(22) Filed: Feb. 12, 2015

(65) Prior Publication Data

US 2015/0156633 A1 Jun. 4, 2015

Related U.S. Application Data

(63) Continuation of application No. 13/215,550, filed on Aug. 23, 2011, now Pat. No. 8,983,466, which is a
(Continued)

(51) Int. Cl.
*H04M 1/66* (2006.01)
*H04W 12/08* (2009.01)
(Continued)

(52) U.S. Cl.
CPC .......... *H04W 12/08* (2013.01); *H04W 12/06* (2013.01); *H04W 88/16* (2013.01); *H04W 92/02* (2013.01)

(58) Field of Classification Search
CPC ...................................... H04W 12/08
See application file for complete search history.

(56) References Cited

U.S. PATENT DOCUMENTS 6,006,106 A 12/1999 Cook et al.
6,233,463 B1 5/2001 Wiedeman et al.
(Continued)

*Primary Examiner* — Justin Lee
(74) *Attorney, Agent, or Firm* — McDermott Will & Emery LLP

(57) ABSTRACT

A system and method of supporting controlled access to multimedia information and media-related services via a broadband access gateway is disclosed. A plurality of user manageable tiers of access privilege may be implemented by the broadband access gateway, that may support communication using, for example, a wireless personal area network and a broadband network. A different degree of user authentication and/or identification may be established for each of the tiers, and users may be restricted in their access to multimedia information and services by their current tier of access privilege. The multimedia information and services may be provided by a variety of access devices via the personal area network, and from providers accessible via the broadband network connected to the gateway. Examples of access devices include mobile multimedia handsets, personal digital assistants, personal computers, digital cameras, and printers. The multimedia information may, for example, comprise data, text, and digitized voice, images, video, and music. The tiers of access privilege may be managed via, for example, the personal area network or from the broadband network, by a user with an access device.

17 Claims, 10 Drawing Sheets

Related U.S. Application Data continuation of application No. 11/095,841, filed on Mar. 30, 2005, now Pat. No. 8,005,476.

(60) Provisional application No. 60/563,894, filed on Apr. 16, 2004.

(51) Int. Cl.
*H04W 88/16* (2009.01)
*H04W 12/06* (2009.01)
*H04W 92/02* (2009.01)

(56) References Cited

U.S. PATENT DOCUMENTS

| | | |
|---|---|---|
| 6,327,355 B1 | 12/2001 | Britt |
| 6,577,628 B1 | 6/2003 | Hejza |
| 6,751,441 B1 | 6/2004 | Murray et al. |
| 6,970,842 B1* | 11/2005 | Ashby ............... G06Q 10/10 705/38 |
| 7,149,705 B1 | 12/2006 | Haruki et al. |
| 7,281,029 B2 | 10/2007 | Rawat |
| 7,502,610 B2 | 2/2009 | Maher |
| 8,983,466 B2* | 3/2015 | Karaoguz ............. H04W 12/08 370/216 |
| 2001/0038609 A1 | 11/2001 | Yamaguchi |
| 2002/0052915 A1 | 5/2002 | Amin-Salehi |
| 2002/0087894 A1* | 7/2002 | Foley ................ H04L 63/083 726/4 |
| 2002/0191635 A1 | 12/2002 | Chow et al. |
| 2003/0033519 A1 | 2/2003 | Buckman et al. |
| 2003/0134622 A1 | 3/2003 | Hsu et al. |
| 2003/0129973 A1 | 7/2003 | Oishi et al. |
| 2003/0171113 A1 | 9/2003 | Choi |
| 2004/0028009 A1 | 2/2004 | Dorenbosch et al. |
| 2004/0029567 A1 | 2/2004 | Timmins et al. |
| 2004/0048624 A1 | 3/2004 | Ko et al. |
| 2004/0248594 A1* | 12/2004 | Wren, III ............. H04W 84/16 455/465 |
| 2005/0064860 A1 | 3/2005 | DeLine |
| 2005/0097079 A1 | 5/2005 | Machida et al. |
| 2005/0241004 A1* | 10/2005 | Pyhalammi .......... G06F 21/43 726/29 |
| 2005/0254651 A1 | 11/2005 | Porozni et al. |
| 2006/0280157 A1 | 12/2006 | Karaoguz et al. |
| 2008/0089295 A1* | 4/2008 | Keeler ............... G06Q 20/206 370/332 |

* cited by examiner

PROVIDING ACCESS DEPENDENT SERVICES VIA A BROADBAND ACCESS GATEWAY

PRIORITY CLAIM

This application is a continuation of U.S. patent application Ser. No. 13/215,550, filed Aug. 23, 2011, issued as U.S. Pat. No. 8,983,466, which is a continuation of U.S. patent application Ser. No. 11/095,841, filed Mar. 30, 2005, issued as U.S. Pat. No. 8,005,476, which claims priority to provisional application Ser. No. 60/563,894, filed Apr. 16, 2004, which are entirely incorporated by reference.

CROSS REFERENCE TO RELATED APPLICATIONS

The present application makes reference to U.S. patent application Ser. No. 11/021,294, entitled "Method And System For Extended Network Access Services Advertising Via A Broadband Access Gateway," filed Dec. 23, 2004, issued as U.S. Pat. No. 8,009,608 on Aug. 30, 2011, the complete subject matter of which is hereby incorporated herein by reference, in its entirety.

The present application also makes reference to U.S. patent application Ser. No. 11/039,020, entitled "Method And System For Providing Registration, Authentication, And Access Via A Broadband Access Gateway," filed Jan. 18, 2005, the complete subject matter of which is hereby incorporated herein by reference, in its entirety.

BACKGROUND

One major common problem faced by cellular and landline service providers is market competition. In today's climate of competitive markets, cellular service providers have found that one way for them to grow market share and defend their businesses is to be proactive and form alliances, and to partner with landline service providers. In addition, cellular service providers seek to differentiate their service offerings, and to capture the largest portion of market revenue by meeting an ever increasing demand for access to a wide range of media forms such as MP3 encoded audio, still and video imaging, data, instant messaging, and email. In a similar manner, the landline service providers have found that to grow market share and ward off competition, they too must be proactive and form alliances, and to partner with cellular service providers. Support for broad economical access to these converging forms of communication is needed to enable unfettered market growth, and to support the development and use of new handheld devices needed to provide increasing levels of mobile multimedia communication functionality.

Although the formation of alliances and partnerships between cellular service providers and landline service providers may help to ward off competition, such alliances and partnerships are faced with other problems. For example, the erection of cellular infrastructure such as cellular towers may be an expensive venture since this may require acquisition of real estate, whether in the form of outright purchases or through leasing. Cellular infrastructure also requires the establishment of one or more expensive backbone links to handle core network traffic. Another cellular-related problem is that the cellular signals do not penetrate and propagate in buildings such as homes and offices very well. This is especially true with the frequencies that are typically utilized in the United States, which may vary between 800 MHz and 1900 MHz or 1.9 GHz.

With present day broadband access gateways, the control of user access to the resources of the broadband network is normally based primarily upon network protocol addresses or physical device addresses from or to which access is attempted. Access is allowed or prohibited by specifying to an access control mechanism a network address, and whether access is or is not to be permitted. Systems that permit control of network access typically provide the same breadth of network access to all users of the network.

In the vast majority of cases, the control of user access is simply binary—the user either is or is not allowed access, and all users are treated equally. No means is provided by which the owner/operator of such a gateway can adjust the breadth or depth of access on a per-user basis, and the criteria upon which access is based are generally established prior to access through registration with the owner/operator of the gateway.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY

A system and method supporting controlled access to multimedia information and media-related services, substantially as shown in and/or described in connection with at least one of the figures, as set forth more completely in the claims.

These and other advantages, aspects, and novel features of the present invention, as well as details of illustrated embodiments, thereof, will be more fully understood from the following description and drawings.

DETAILED DESCRIPTION OF THE INVENTION

Aspects of the present invention relate to the seamless merging of wide area networks, from any kind of wired and/or wireless wide area networks, to pockets of wired and/or wireless local area networks and personal area networks, which may be located in homes or other environment such as an office or business. More specifically, aspects of the present invention pertain to simplified (e.g., one-button) and/or automatic registration, authentication, and access of wireless access devices to services available via a broadband network gateway. Such a gateway may permit broadband network access via, for example, a personal cellular microcell, a personal area network (PAN), a wired or wireless wide area network (WAN), wireless local area network (WLAN) or other type of network located within a premises such as, for example, a home, office, business, or the like. Services that may be available via such a broadband gateway connection include, for example, access to the public switched telephone network (PSTN); Internet protocol (IP) phone access; extended access to commercial cellular and PCS networks such as, for example, TDMA, CDMA, and GSM; and access to and/or control of a variety of multimedia access devices or networked resources capable of providing streams of images, still pictures, video, and audio; to name only a few. Examples of multimedia information include streaming video, broadcast video, voice, digital data, text, digitized audio, digitized still images, digitized video, and digitized music. The merging of these various types of networks may enable transparent communication of all types of media between access devices, which may be coupled in a wired or wireless fashion to one or more of these networks. In an embodiment of the present invention, access to services available through a wireless broadband gateway may be simplified, permitting their use by a wider group of users of access devices in, for example, homes, offices, and businesses.

Figure 1:
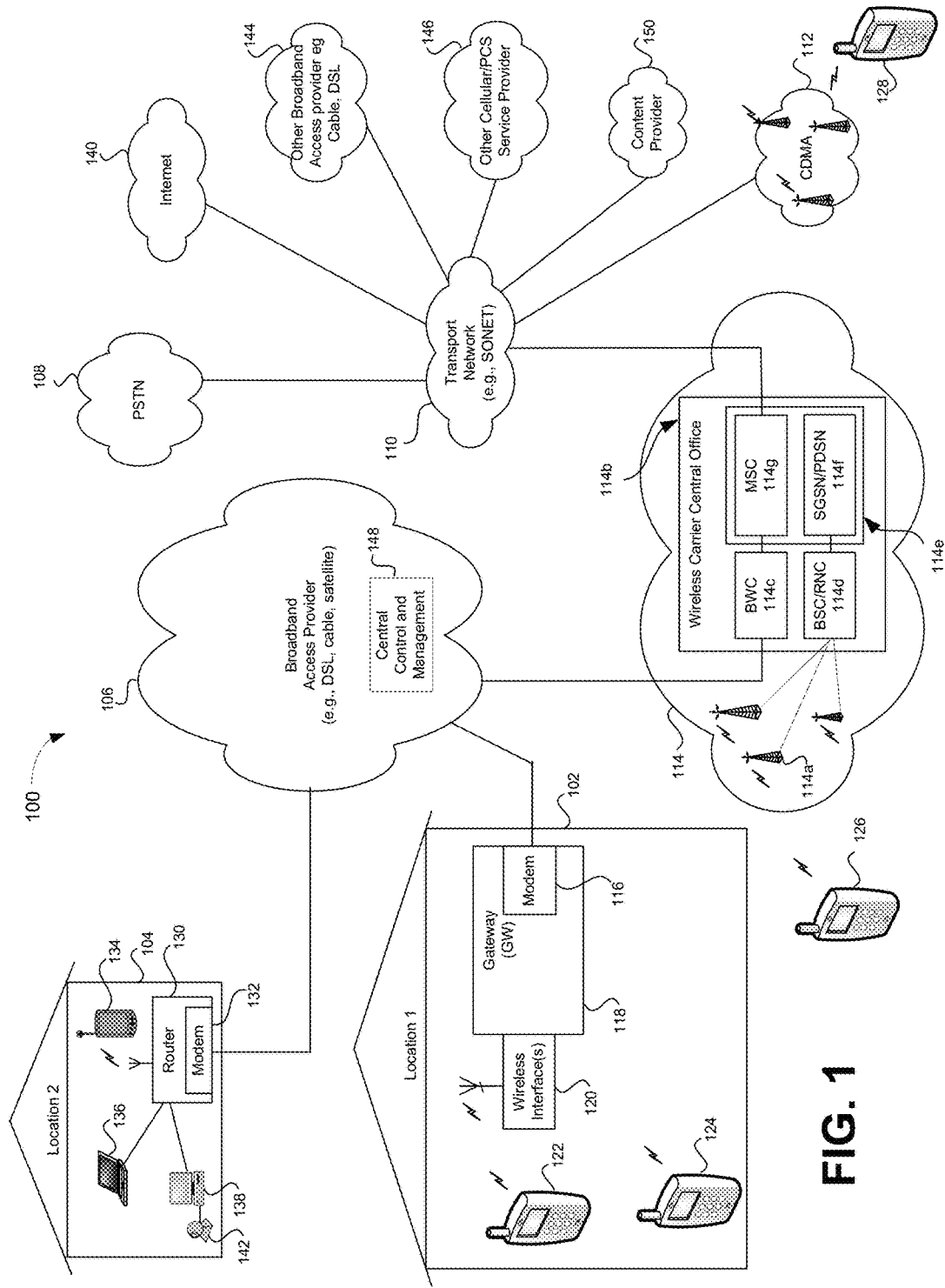
FIG. 1 is a block diagram illustrating an architecture of an exemplary communications system in which a representative embodiment of the present invention may be practiced.

FIG. 1 is a block diagram illustrating an architecture of an exemplary communications system in which a representative embodiment of the present invention may be practiced. Referring to FIG. 1, there is shown a first location 102, a second location 104, a broadband access provider (BAP) 106, public switched telephone network (PSTN) 108, a transport network 110, wireless networks including CDMA network 112 and GSM network 114, and access devices 126 and 128. The first location 102 comprises a gateway 118 having a modem 116, a wireless interface(s) block 120, and the access devices 122, 124. The access devices 122, 124, 126, 128 may comprise, for example, a mobile multimedia handset having a high level of functionality such as, for example, that of one or more of a digital video or still camera, a portable audio (MP3) player, a personal digital assistant, and a voice handset. The access devices 122, 124, 126, 128 may be capable of operating using, for example, a personal area network and/or wireless local area network compliant with, for example, Bluetooth, IEEE 802.11 a/b/g/n, and/or IEEE 802.15.3a ultra-wideband standards. The second location 104 comprises a router 130 having a modem 132, and a plurality of wireless access devices. The plurality of wireless access devices at the second location 104 may comprise a personal computer (PC) 138, a laptop 136 and a wireless personal digital assistant (PDA) 134. A peripheral such as a digital camera 142 may be coupled to the personal computer 138. Other peripherals such as printers, digital scanners, speakers, and the like, which are not shown, may also be coupled to the personal computer 138 and/or laptop 136. The wireless interface block 120 may comprise a plurality of interfaces such as a Bluetooth interface, an IEEE 802.15.3a ultra-wideband interface, and any combination of an IEEE 802.11 a, b, g and/or n interface.

FIG. 1 also comprises another broadband access provider block 144, another cellular/PCS service provider block 146, a central control and management block 148, and content provider 150. The other broadband access provider block 144 may be, for example, a cable, DSL, or other type of broadband access provider. The central control and management block 148 may comprise suitable logic, circuitry and/or code that may be adapted to handle content delivery and security functions such as authentication, validation, key or certificate management, and authorization. The central control and management block 148 may also be adapted to handle provisioning and service management. In a representative embodiment of the present invention, the central control and management block 148 may establish communications links with, for example, the gateway 118, the broadband access provider 106, the other broadband access provider 144, the other cellular/PCS service provider 146, the CDMA network 112, and the GSM network 114 using actual or virtual connections.

The broadband access provider 106 may be, for example, a cable operator, telephone company, or satellite operator providing Internet access along with other communication services. In instances where BAP 106 is a telephone company, broadband service to locations 102, 104 may be provided via DSL or other broadband access technology. Accordingly, the modems 116, 132 may be DSL modems. In instances where BAP 106 is a cable operator, broadband service to locations 102, 104 may be provided via cable. Accordingly, the modems 116, 132 may be DOCSIS compliant or other type of cable modem. Given the rapid decrease in the cost of leased telephone lines over the past decade or more, the connection to the location 102, 104 may also be T1 or T3 connections. For example, a switch located at a central office (CO) (not shown) may be utilized to couple a T1 or T3 connection between the second location 104 and the PSTN 108.

The gateway 118 may comprise an integrated DSL modem, cable modem or other high-speed modem that may be required for handling a connection such as a T1 or T3 connection. Alternatively, the gateway 118 may be coupled to an external DSL modem, cable modem or other high-speed modem that may be capable of handling connections such as a T1 or a T3 connection. The gateway 118 may be adapted so that it has access to protocol stack information that may be related to the GSM and/or CDMA networks 114, 112, respectively. The gateway 118 may also be adapted to provide protocol support for communication with "other cellular/PCS service provider" block 146.

Each of the CDMA and GSM networks 112, 114 may comprise a plurality of cell sites (a/k/a cellular towers) that are located in geographical cells within each of the networks. Within the GSM network 114, each of the cell sites such as, for example, cell site 114a may comprise a base transceiver station (BTS), and one or more base transceiver stations (BTSs) may be coupled to wireless carrier central office 114b. The wireless carrier central office 114b may comprise a base station controller/radio network controller (BSC/RNC) such as BSC/RNC 114d. One or more base station controllers/radio network controllers (BSCs/RNCs) may be coupled to the core network 114e, that comprises a network edge switch called a mobile switching center (MSC), such as MSC 114g, and a serving GPRS support node (SGSN)/packet data serving node (PDSN) 114f, of the GSM network 114. The mobile switching center may be coupled to, for example, the PSTN 108 via the transport network 110. As an access device moves out of range of a first cell site to within range of a second cell site, the decrease in signal power received from the first cell site and the increase in signal power received from the second cell site causes initiation of handoff of a call from the first cell site to the second cell site. In cases where there is no second cell site to handoff to, the call may be maintained by the first cell site until it is attenuated to a threshold where it is no longer feasible to maintain the call. At the point where the power reaches or falls below this threshold, the call may drop and any related call resources may be relinquished. In a home and/or office environment, it may be desirable to have a second network to which the call may be handed off to.

As an illustration, a user may be on their way home and as the user approaches their home, the signal may fall below a minimum signal power threshold that is required to maintain a call. However, instead of dropping the call, the call may be handed off to, for example, a PAN or a wireless local area network (WLAN) that may be located within the user's home or an unlicensed wireless access system that may be located in the user's home. For example, with reference to FIG. 1, as access device 126 migrates from the vicinity of the serving cell site 114a in GSM network 114 towards the wireless interface 120 in the first location 102, the call may be handed off from the cell site 114a in GSM network 114 to the wireless interface 120 coupled to the gateway (GW) 118 at the first location 102. Accordingly, instead of the call being dropped, the call has been seamlessly handed off and is now being handled by the gateway 118 via the wireless interface 120. The resulting wireless data may then be communicated to the GSM network 114 via the broadband connection to the BAP 106 which is connected to the broadband wireless local area network controller (BWC) 114c.

In this illustration, the user is handed off to their PAN, WLAN, or other network located within their home. However, the user could also have been handed off to another network system such as a neighbor's network. In any case, a gateway coupled to the wireless interface which is providing service to the user may communicate at least a portion of the data to, for example, the cable or DSL BAP 106, the GSM network 114, CDMA network 112, other broadband access service provider 144, other cellular/PCS service provider 146 and central control and management block 148. The user may be provided with a notification that indicates the presence of the PAN, WLAN, or other unlicensed network. For example, an icon representative of a personal area network may be displayed on the screen of the access device 126 once a soft or hard handoff is achieved from a serving cell site in GSM network 114 to the wireless interface 120 at the first location 102. A special tone or other audio alert may also be utilized to indicate that the call has switched to the wireless interface 120.

In instances where the gateway 118 detects a compatible access device that may be within the range of the wireless interface 120, the gateway 118 may immediately advertise its available services to the access device. In this regard, the gateway 118 may be adapted to transmit service advertisements to the access device in order to alert a user of the access device of the types of services that are being offered by the gateway 118. Signals containing icons representative of the services may be transmitted to and displayed on a screen of the access device and/or audio alerts may be utilized to notify the user of these services.

In another embodiment of the invention, quality of service (QoS) may also be advertised by the gateway 118. For example, when a user is being serviced by the wireless interface 120, the gateway 118 may advertise that stereo audio is available.

Access devices may be pre-registered so that when they are within the range of the wireless interface 120, the gateway 118 may automatically recognize them. For the pre-registration, an administrator of the gateway 118 at the first location 102 may register access devices that are allowed to access the gateway 118 when they are within the range of the wireless interface 120. Pre-registration may be done prior to the access device accessing the gateway 118. During pre-registration, an administrator or owner of the gateway 118 may enter registration or configuration information such as device IDs of access devices belonging to friends and/or family member's into a registration database associated with the gateway 118. As a result, these devices will be allowed to access at least a portion of the services offered by the gateway 118 whenever they attempt to access the gateway 118 by pressing a single button, for example. Opportunistic registration permits a user of an access device to register with the gateway 118 automatically with little or no effort on the part of the user. In this regard, registration information may be sent to the gateway 118 from an access device during an initial access and the gateway 118 may choose to accept or deny the registration. The registration information may be automatically or manually sent to the gateway 118.

In certain instances, an access device may not have been pre-registered to access the network. In this case, one button access may be provided. A single button such as a hard coded button or software-enabled button on an access device may be programmed to transmit identifying information from the access device to the gateway 1118. The gateway 118 may utilize this transmitted identifying information to grant or deny access to its services. For example, one button may be programmed to contain access device identifying information related to accessing the services provided by gateway 118 at the first location 102. The gateway 118 may also be adapted to utilize digital certificates to authenticate access devices.

An interactive process may also be provided, whereby the gateway 118 may prompt or request particular information, for example a password from an access device requiring network access. If the particular information is received, then access to at least some of the services provided by the gateway 118 may be granted and if not, the access to at least some of the gateway's services may be denied.

In another embodiment of the invention, the one button access may be provided via software-enabled button (soft button) or hardware-enabled button (hard button). In this regard, the software button may be displayed on a screen of an access device.

A "walled garden" approach may be utilized to provide access to the services that may be offered by a particular gateway, for example, gateway 118. Under the walled garden approach, when an access device first registers or is identified, a basic set of services may be provided by the serving gateway 118 to the access device 124. The basic services offered may vary among each gateway. At least some of the basic services that are provided by a gateway such as gateway 118, may be offered without authenticating the access device 124. However, other services may only be offered if an access device such as access device 124 is properly authenticated. These services that are offered may be services that were advertised by the gateway 118.

In an aspect of the invention, access to additional services may be granted based on, for example, user identity, access device identity and or user input. The services offered to an access device by a gateway may be arranged in a hierarchical structure such as a tier. For example, in a first tier, a user may be prompted to enter membership information such as a member identification number. Upon authentication of the membership identification number, the first tier may provide restricted access with pop-up advertisements that may not be disabled. In a second tier, for example, a user may be prompted to enter a password. Upon authentication of the password, second tier information may provide restricted access to gateway services without pop-up advertisements. In a third tier, for example, entering billing information such as an account number or credit card or check card number may provide unlimited and/or unrestricted access to all the services offered by a gateway. A fourth tier may provide only operating instruction and information for guests.

An administrator of the gateway may establish the type of access provided by the walled garden. For example, if the first location 102 is a hotspot at a Cafe, the provider of the gateway may establish the service access levels or tiers that may be provided by the gateway 118.

When an access device is within the range of the gateway 118, wireless service is handed off from a serving cell site 114a in the GSM network 114 to the gateway 118. The access device may be authenticated by the gateway 118 and permitted to access at least some of the services offered by the gateway 118. Once the access device is authenticated, at least a portion of the information on the access device may be made available as a networked resource via the gateway 118. A user of the access device may choose whether information on the access device may be made available to the gateway and if so, that information which will be made available, and that information which will be unavailable to the gateway 118. In this regard, where information is made available, the gateway 118 may maintain a list of the resources that may be available on access devices that may be coupled to the gateway 118. For example, a list of contact information, calendar information, audio files, video files and/or data files stored on the access device may be sent to the gateway 118.

The resources that are available on the access device may also be advertised to other access devices that may be in communication with the gateway 118. Advertisement of the resources that may be available on an access device may be restricted to, for example, a list of particular devices, a particular type of devices or to a particular user. Accordingly, a user may have to be properly authenticated prior to certain information being made available to the user. Additionally, advertisement of the resources may cause certain icons representative of the resources to be displayed on other access devices. In a similar manner, icons representative of the resources that may be available on these other access devices may also be presented on the access device.

An access device may be provided with a welcoming screen that may allow a user of a device to sign up for either free or paid services. Once the signup is complete, subsequent access by the user may be authenticated by the gateway 118 utilizing the signup information. Whenever an access device registers with and/or is authenticated by the gateway 118, information on the access device may be updated and/or synchronized with information that may be on the gateway 118.

Devices within the location of the gateway 118 may be configured to register certain portions of their data content with the gateway 118 through a gateway registration process. Once data for these devices is registered to the gateway 118, the gateway may maintain a database, which keeps track of the data that is available, and its location. Accordingly, if the data previously stored in the database is no longer available, then information representative of the previously stored data may be removed from the database. Data from devices coupled to the gateway 118 such as on laptops, CD players, digital video disk (DVD) players, TIVO, personal video recorders (PVRs), personal digital assistants (PDAs) and other devices, may be registered with the gateway 118. This data may comprise audio, video, still pictures, and/or text.

At least a portion of the registered data may be made available to other network access devices via the gateway 118. In an aspect of the invention, the gateway 118 may be adapted to maintain a searchable list of data that may be available via the gateway. In this regard, the gateway may comprise a search engine that may be utilized to locate and distribute data that may be made available through the gateway 118. In another aspect of the invention, data may be made available to access devices via advertising by the gateway 118. Access devices may be configured to seek out particular data that may be of interest. Accordingly, an access device may be adapted to receive and process only those gateway advertisements may fit particular criteria. Those advertisements that may not fit the particular criteria may be discarded or ignored.

When an access device is within the range of the gateway 118, wireless service may be handed off from a serving cell site 114a in the GSM network 114 to the gateway 118. The access device may be authenticated by the gateway 118 and permitted to access at least some of the services offered by the gateway 118. Once the access device is authenticated, a user of the access device may have a desire to locate a particular video presentation. The user may access the search engine, which may have been advertised to the user's access device by the gateway 118. The search engine may appear on the display of the user's access device as an icon. The user may then activate a search by selecting the search engine icon, inputting a name of the video presentation and executing the search.

In another embodiment of the invention, the gateway may be adapted to classify information based on a given criterion. This classification may assist with locating information based on a particular criterion. In this regard, a user of the access device may be presented with a list of classifications and may select one, which may be of interest based on a particular criterion. This may narrow the focus of a search.

The gateway may also be utilized to facilitate seamless synchronization of data between devices that may be wired or wirelessly coupled to the gateway 118. For example, audio files located in a music folder on a PC coupled to the gateway 118 may be synchronized with a wireless media player coupled to a hot spot in an airport while a user of the wireless access media player waits to board a flight. In this regard, the gateway may determine what files need to be synchronized and control how the synchronization is accomplished. The same is true for files that may be downloaded from the PC to the wireless access media player, and for files that may be uploaded from the wireless access media player to the PC. Calendar and/or contact information may also be updated and/or synchronized with a mobile multimedia handset in a similar manner utilizing the gateway 118.

A location-aware service determines an approximate location of a network device and adapts delivery of a particular service application and/or content according to a quality of service criterion. The delivery of location-aware services may be controlled by the gateway 118. For example, a user of an access device may request playback of an audio clip via the gateway 118. After receiving the request for playback of the audio clip, the gateway 118 may determine that a channel between the gateway 118 and the user's access device may only be capable of maintaining a reduced playback rate. As a result, instead of sending 128 kbps encoded audio data, then the gateway may send 96 kbps data. Hence, in a case where the audio data was originally stored in 128 kbps sampled audio data, then the gateway 118 may transcode the 128 kbps sampled data to 96 kbps audio data.

In another illustrative embodiment of the invention, while the GSM network 114 is servicing the access device, lower compression rates may be utilized to provide service to the access device. However, when the access device roams within range of the wireless interface 120 and is being served by the gateway 118 through wireless interface 120, higher compression rates may be utilized. For example, audio data sampled at a data rate of 64 kbps may be utilized for playback on an MP3 enabled telephone while the phone is being serviced by a cell site 114a in the GSM network 114. However, once the MP3 enabled telephone is within the operating range of the wireless interface 120 and is being serviced by the gateway 118, the gateway 118 may automatically adapt to a higher data rate of, for example, 92 kbps or 128 kbps.

Automatic format conversion by the gateway 118 may include converting data from a first format to at least a second format suitable for delivery and/or display on an access device. This may permit data that would otherwise be incompatible with a first access device to be played on that first access device. For the location-aware services based on QoS, data was converted from a first format 128 kbps to a second format 96 kbps to achieve and/or maintain a particular QoS, but the data type remained the same. In this case, the audio format and/or its data type may be different. For example, if the audio format was MP3, then after the conversion, the format remained WAV and/or the sampling rate may have decreased from 128 kbps top 96 kbps.

In conventional wired caller ID systems, a name and/or directory number (DN) of a calling party may be transferred either in-band or out-of-band to a called party and may be displayed on the called party's caller ID display when a call is answered. In these conventional systems, the caller ID information is limited to a caller's name, directory number (DN), general location and/or time of call. In wireless telephone systems, in order to save on bandwidth, only a caller's directory number is transferred and displayed to a calling party. However, if the calling party's directory number and name is stored in the called party's phone, then the stored name and stored directory number will be presented on a display of the called party's terminal. In this case, the stored directory number is compared with the transferred caller's directory number, and if a match occurs, then a name corresponding to the matching directory number is also displayed on the called party's terminal.

In accordance with an embodiment of the invention, the gateway 118 is adapted to determine the appropriate caller ID information that may be displayed in a called and/or calling party's caller ID. In this case, reverse caller ID information may be displayed on both a calling and a called party's terminal by the gateway 118.

If a called and/or calling device is a mobile multimedia handset and/or laptop, for example, contact or other personal information may be displayed the caller's and/or calling party's directory number. The level or amount of information that may be displayed may be varied. Certain sensitive information relating to either the called or calling party may be restricted from being displayed.

In current cellular communication systems, over the air (OTA) programming is utilized to program a cellular telephone during the provisioning process. In some instances, cellular providers have established websites that may be utilized or OTA programming. In this regard, a cellular subscriber may access the website and enter information such as the assigned directory number and the electronic serial number of the cellular telephone being programmed.

In accordance with a representative embodiment of the invention, an access device may be registered using over the air programming via the gateway 118. A user of an access device may send access device information to the gateway 118 using, for example, a default interface that may be presented to and displayed on a screen of the access device when the access device first enters the service area of the wireless interface 120. During registration, the capabilities of an access device may be sent to the gateway 118 and may be shared with devices that may be coupled to the gateway 118.

Since the gateway acts as a registrar of information for all the access devices that may be wired or wirelessly coupled to it, the gateway may function as a personal digital assistant for any of these access devices. In an illustrative example, a first device, a first PC and a second PC are being serviced by the gateway 118. The first access device receives a call and the caller ID information shows the caller's name, home directory number and home address. However, the first PC contains the business address for the caller and the second PC contains the monthly calendar information for the caller. Assume that the caller had a desire to setup a business meeting. In accordance with an aspect of the invention, the gateway 118 may be adapted to provide the business address of the caller to the first access device and also provide the caller's calendar to the first access device. In this manner, the network centrally provides all the information necessary for scheduling the meeting. In this example, the first PC may belong to the user of the first access device and the second PC may belong to the caller.

This concept may be extended to a look-up or 411 directory assistance on the Internet. The lookup may also be location dependent. In this regard, if a user is located in Hollywood and requests a hotel location, the gateway 118 may only cause the hotels that are located in Hollywood to be displayed to the user.

The gateway 118 may also be adapted to create profile information based on data usage. These created profiles may be utilized to create social networks for people having common interests. Accordingly, users may be permitted to post their interests and also select those people having similar interests based on the created profile. Based on the created profile information and the posted user interests, the gateway 118 may also generate a list of those people who have similar interest and also those users that may potentially have similar interests.

Given the capability to seamlessly operate an access device as one migrates from outside the home into the home, it is desirable to have a single device that may be adapted to control at least some of the devices that may be found within the home. In addition to its normal voice or data communication operating mode, an access device may be configured to operate as a universal remote that may be utilized to remotely control a plurality or other devices such as a TV, DVD, CD, Stereo, display monitor, or a combination thereof. Most access devices currently have an IR transmitter, which may be adapted to communicate with other IR receiver devices.

The access device may be used for wireless communication and for remotely controlling an electronic device with as a TV, CD/DVD recorder/player, or other device. The access device may also include at least one soft-button that may be enabled through the gateway 118 and may be utilized to control any other device that may be coupled to the gateway 118.

The gateway 118 is adapted to virtually aggregate data that may be visible from a plurality of access devices or other network devices. Although the gateway 118 may be adapted to store some service and content related information, the gateway 118 does not actually store copies of data that resides on the access devices and/or other network devices that may be wired or wirelessly coupled to it. However, the gateway 118 may store, for example, metadata information that may be utilized to locate and access the information stored on the access devices and/or other network devices. The gateway is therefore adapted to function as a registrar of both service and content related information.

Whenever an access device registers with and/or is authenticated by the gateway 118, information may be collected from the access device and related metadata information may be updated and/or synchronized with information that may be currently stored on the gateway 118. Additionally, when a device is no longer being serviced by the gateway 118, associated information may be released from the gateway 118. In this regard, the virtual aggregation function performed by the gateway 118 guarantees that the most current information is accessible from the access devices.

Figure 2:
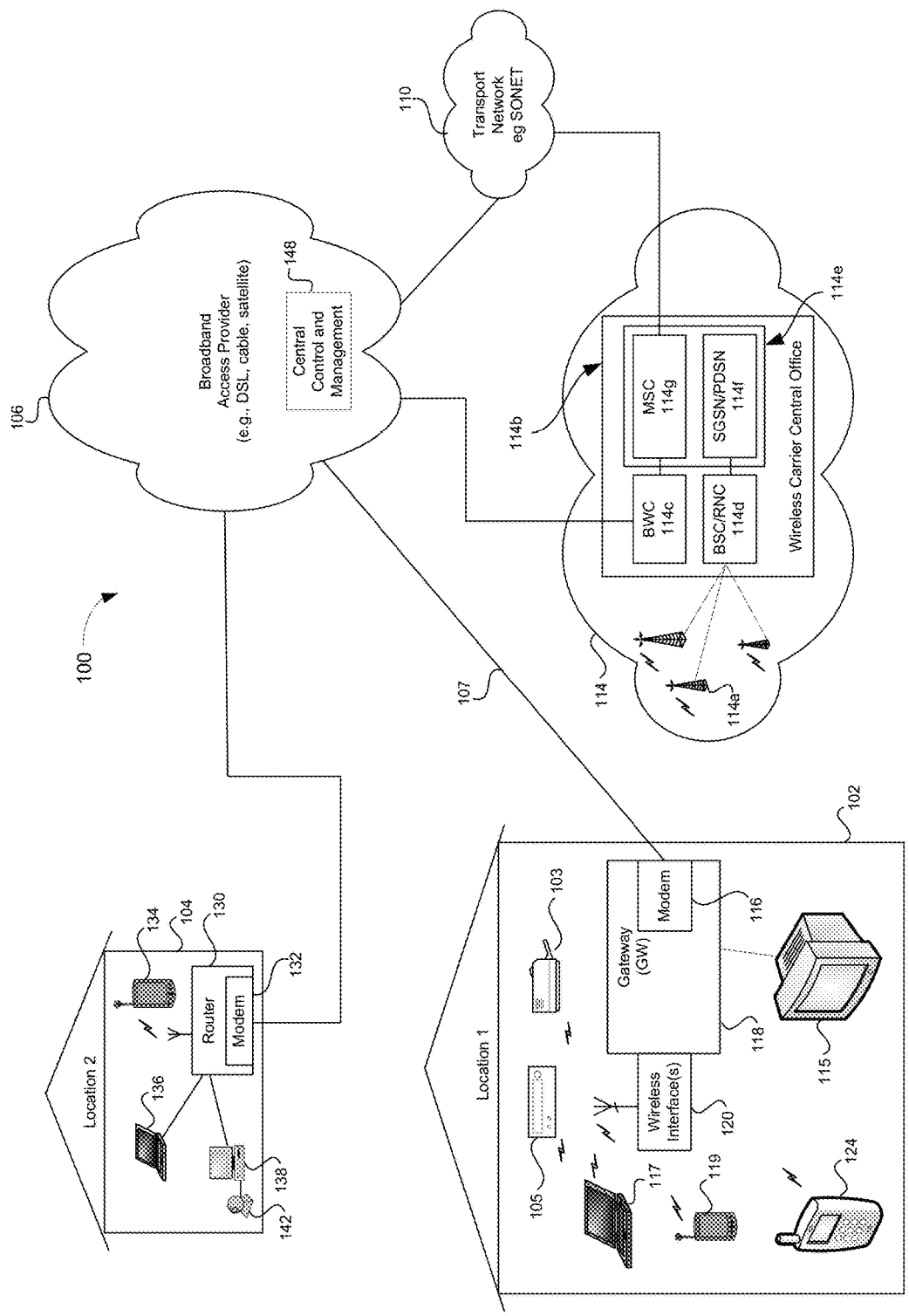
FIG. 2 shows a block diagram illustrating an exemplary communication system, in accordance with a representative embodiment of the present invention.

FIG. 2 shows a block diagram illustrating an exemplary communication system 100, in accordance with a representative embodiment of the present invention. The communication system 100 shown in FIG. 2 comprises a wireless interface 120, a gateway (GW) 118 with a modem 116, and an array of access devices such as, for example, a printer 103, a stereo receiver 105, a laptop 117 and a wireless personal digital assistant (PDA) 119, at location 102. The communication system 100 of FIG. 2 also comprises an access device 124 that may correspond, for example, to the access devices 122, 124, 126 of FIG. 1. A second location 104 within communication system 100 comprises a router 130 with a modem 132, and a plurality of wireless access devices. The plurality of access devices at the second location 104 may, for example, comprise a personal computer (PC) 138, a laptop 136, and a wireless personal digital assistant (PDA) 134. A peripheral such as, for example, a digital camera 142 may be coupled to the personal computer 138. Other peripherals such as, for example, printers, digital scanners, speakers, and the like, that are not shown in FIG. 2, may also be coupled to the personal computer 138 and/or laptop 136. The wireless interface 120 may comprise a plurality of interfaces such as, for example, a Bluetooth interface, a cellular interface, and any combination of an IEEE 802.11a, b, g, and/or n interface, and/or an IEEE 802.15.3a ultra-wideband interface. Although the following discussion refers frequently to the capabilities and actions of the gateway 118 and wireless interface 120, the same may be said of the router 130 with the modem 132 of FIGS. 1 and 2, for example, without departing from the spirit and scope of the present invention.

In accordance with a representative embodiment of the present invention, a wireless access device such as access device 124 may be mobile, and may move between the personal area network/wireless local area network coverage provided by wireless interface 120 at location 102, the wide area network coverage provided by, for example, GSM network 114, and the coverage provided by the router 130 and modem 132 at location 104. The location 102 may, for example, be the home of the user of the access device 124, the home of a friend or relative of the user of access device 124, or an office, business, etc., where the user of access device 124 may travel. The location 104 may, for example, be a second home of the user of access device 124, the home of a friend or relative, an office, or may have no personal or business relationship with the user of access device 124. In a representative embodiment of the present invention, the gateway 118 may comprise, for example, a set top box that may be coupled in a wireless or wired fashion to access devices such as, for example, a laptop computer or television, such as the laptop 117 and the television 115 of FIG. 2. Access to the communication bandwidth of a broadband network as previously described may be provided by the gateway 118 and the modem 116 to wired or wireless access devices in the vicinity of location 102, and via router 130 and modem 132 to wired or wireless access devices in the vicinity of location 104, as shown in FIG. 2. This architecture may provide extended access to wireless networks such as, for example, the GSM network 114, CDMA network 112, other cellular/PCS service provider 146, Internet 140 and public switched telephone network 108, of FIG. 1. The modem 116 is shown connected to a broadband access provider (BAP) 106 via a broadband connection 107. The broadband connection 107 may comprise, for example, a digital subscriber line (DSL) connection, a cable network connection, a satellite connection, a T1 or T3 network connection, or similar broadband communication link. The modem 116 is compatible with the broadband connection 107, and may be, for example, a DSL modem, a DOCSIS-compliant cable modem, a satellite service modem, or T1 or T3 compatible modem-type device. The broadband connection may provide access through BAP 106 to location 104, and via transport network 110 to, for example, GSM network 114.

In the example illustration of FIG. 2, a user of the access device 124 may or may not be engaged in communication with another system or subscriber accessible via the GSM network 114, or other wide area network of FIG. 1. Although the present example of FIG. 2 shows a GSM network 114, a representative embodiment of the present invention may be employed with respect to other wide area networks such as, for example, the CDMA network 112 and other cellular/PCS service provider 146, shown in FIG. 1.

The illustration of FIG. 2 shows a number of possible multimedia information resources including, for example, the stereo 105, the laptop 117, and the wireless PDA 119 at location 102, and the digital camera 142, the PC 138, the laptop 136, and the wireless PDA 134 at location 104. In a representative embodiment of the present invention, it may be desirable to provide access to certain of the multimedia information resources accessible via the gateway 118 or router 130, such as, for example, the Internet 140 or other resources accessible via the BAP 106, while at the same time restricting access to others of the multimedia information resources such as, for example, the personal or business information and resources accessible on the access devices within the proximity of the gateway 118 and router 130. For example, one user of an access device such as, for example, access device 124 may be a family member or business associate of the owner/operator of the gateway 118. The owner/operator of the gateway 118 may desire to allow the user of access device 124 to access the personal or business information resources that may be accessible via the gateway 118. The owner/operator of gateway 118 may, however, desire to restrict access by other users of access devices only to the Internet 140, or other resource accessible via the BAP 106.

A representative embodiment of the present invention may allow the owner/operator of a gateway or router such as, for example, the gateway 118 and router 130 of FIG. 2 to control access to personal or business information and resources using a "walled garden" approach. That is, the owner/operator may establish a number of tiers or levels of access privilege, where each tier or level of user access may require a different degree or amount of authentication of the user/group desiring access. Access to the various multimedia information resources may be arranged by the owner/operator of the gateway according to the nature of the multimedia information resource. Those resources or types of information being the most personal or private, or having the greatest value, may be accessible only to the tier or level having provided the greatest degree of user authentication. Other information resources may be accessible depending upon proof of ability to pay for the use of the resource such as, for example, a printer service, pay music service, or other service where value of the service and not privacy or protection is the primary issue.

In a representative embodiment of the present invention, the establishment of the rules and requirements controlling access may, for example, be performed via direct communication of an access device with a gateway or router such as, for example, the laptop 117, wireless PDA 119 or access device 124 communicating directly with gateway 118. The establishment of rules and requirements may be via an access device in communication with a central control and management function such as, for example, with the central control and management block 148 as shown in FIG. 2 with laptop 136, PC 138, or wireless PDA 134 communicating via router 130 and BAP 106. In the latter case, the information relating to user access may be communicated by the central control and management block 148 to the appropriate gateways and routers. A representative embodiment of the present invention may allow an owner/operator of a broadband access gateway such as, for example, the gateway 118 of FIGS. 1 and 2, to establish or modify tiers of user access privilege from virtually anywhere.

Figure 3:
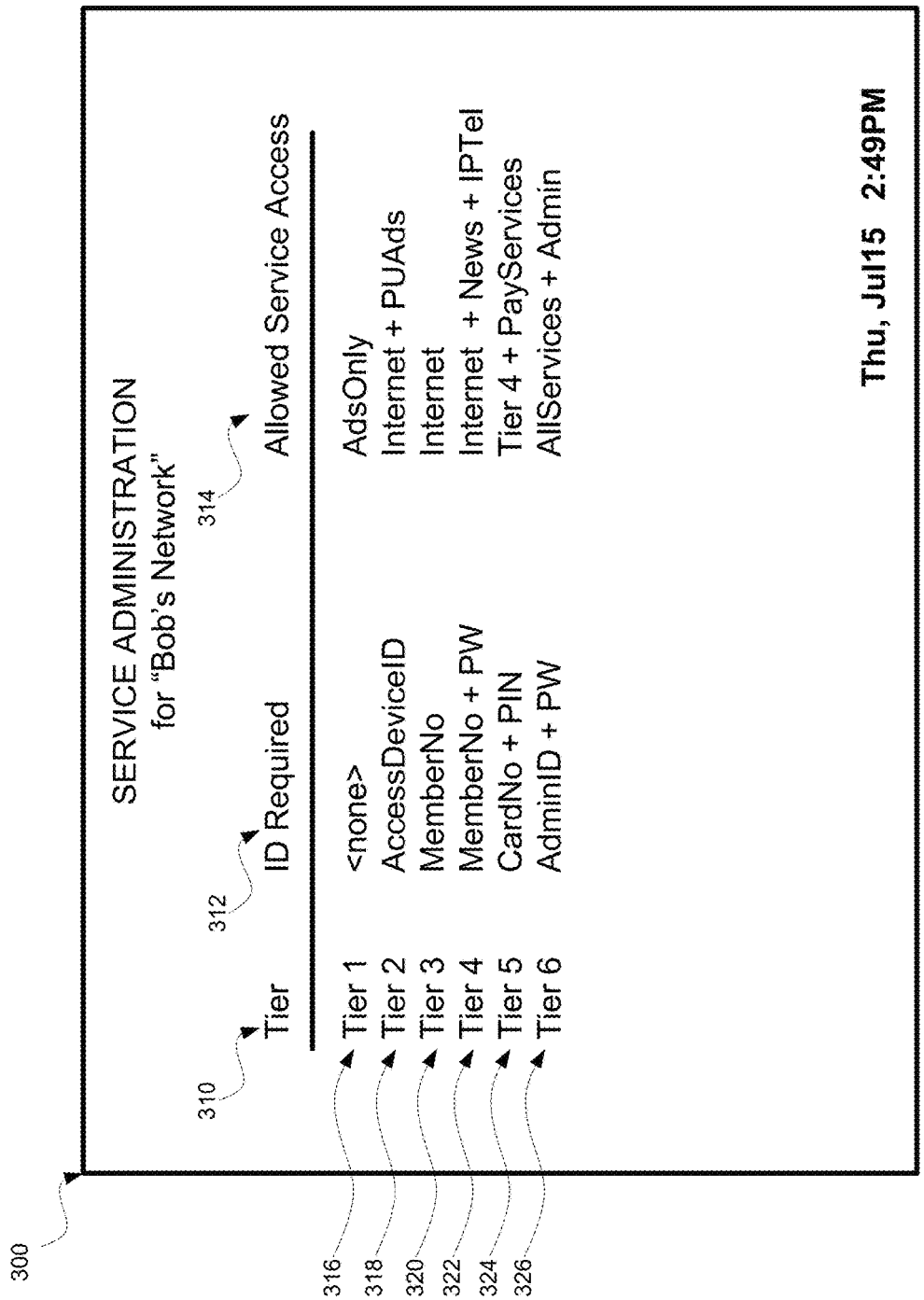
FIG. 3 shows an illustration of an exemplary service administration screen for a broadband access gateway that may correspond, for example, to the gateway or router of FIG. 2, in accordance with a representative embodiment of the present invention.

FIG. 3 shows an illustration of an exemplary service administration screen 300 for a broadband access gateway that may correspond, for example, to the gateway 118 or router 130 of FIG. 2, in accordance with a representative embodiment of the present invention. The screen 300 of FIG. 3 is characterized by a tabular format of textual information, although in other representative embodiments of the present invention, other formats such as, for example, iconic representations may be used for the displayed information. The screen 300 may permit an owner/operator of a broadband access gateway in accordance with a representative embodiment of the present invention to define a number of service access tiers or levels, by defining the identification or authentication information required, and the corresponding service access that is allowed. The example shown in FIG. 3 illustrates a system supporting six tiers of service, represented by Tier 1 316 though Tier 6 326, although a representative embodiment of the present invention may support a greater or lesser number of tiers or levels having a different assignment of names. Each of the rows Tier 1 316 through Tier 6 326 of the screen 300 comprises three elements: a tier identifier, shown as the Tier field 310; the form of identification or authentication required to be known to the gateway for service in that tier to be permitted, shown in the ID Required field 312; and the services accessible when operating within that tier, shown in the Allowed Service Access field 314.

For example, the row Tier 1 316 of FIG. 3 may represent a tier/level of service access wherein an access device may be provided only advertisements (i.e., the value in the Allowed Service Access field 314=AdsOnly), if no identification provided by the access device is known to the gateway (i.e., the value in the ID Required field 312<none>). This entry may be configured to support a situation, for example, when an access device is unknown to the gateway due to having never been registered (as described above), and no other form of identification or authentication is provided by the access device of the table in FIG. 3.

The second row, Tier 2 318, may represent a tier/level of service access wherein an access device may be provided Internet access subject to pop-up advertisements (Allowed Service Access field 314=Internet+PUAds), if the access device has been registered and is known to the gateway by its access device ID (i.e., the value in the ID Required field 312=AccessDeviceID). This entry may be adopted for use when, for example, an access device is registered using some form of identification such as, for example, an electronic serial number, a media access control (MAC) address, or some other unique identifier (as described above).

The third row of FIG. 3, Tier 3 320, may represent a tier/level of service access wherein an access device may be provided Internet access unhindered by the pop-up advertisements of the Tier 2 318 level (i.e., the value in the Allowed Service Access field 314=Internet) described above, if the access device has been registered and is known to the gateway by an associated member number (i.e., the value in the ID Required field 312=MemberNo). This may be applied when, for example, an access device is registered to a user that is a member of, for example, a group owning or operating the gateway being accessed, or a member of an affiliated organization. Being a member of such a group may represent a higher level of support of the operation of the broadband access gateway, and may entitle one to a higher level of service access. It may also represent greater certainty of locating the user, or the organization to which they belong, if the need arises.

The fourth row, Tier 4 322, may represent a level of service access wherein an access device may be provided Internet access along with a news service, and access to Internet telephone service (i.e., the value in the Allowed Service Access field 314=Internet+News+IPTel), if the access device has been registered, and is known to the gateway by an associated member number and a password (i.e., the value in the ID Required field 312=MemberNo+ PW). This higher level of service access may be permitted when, for example, an access device has not only been registered to a user that is a member of a known group, as described above with respect to the Tier 3 320 tier, but in addition, when the user can also correctly supply an associated password. By having not only a registered group identity but also an individual password, the user of the access device may be further identified and authenticated. They may therefore be held personally accountable for use, and accorded a higher level of access privilege.

The fifth row, Tier 5 324, may indicate a level of service wherein an access device may be permitted access to all of the services provided to the next lower level, and in addition, provided access to any services requiring a usage fee (i.e., the value in the Allowed Service Access field 314=Tier 4+PayServices). Access at this level may be permitted when the user of the access device has supplied a commercial credit card number and an associated personal identification number (PIN) (i.e., the value in the ID Required field 312=CardNo+PIN). Because a secure means of payment (i.e., one that can be authorized before service is granted) is available, the user of the access device may be allowed to incur charges for pay services. A per-use or per-day membership fee may also be charged, effectively making the user of the access device a temporary member of a group. For that reason, such a user may be given the service access of a member (e.g., services for those qualifying for Tier 4 322).

The last row of the screen 300 shows an entry Tier 6 326 that may, for example, represent a tier/level of service access wherein a user of an access device may be permitted access to all of the information services accessible through the gateway. In addition, the user may be permitted access to any administrative services such as, for example, the ability to establish registration of new users, the establishment/ modification of tiers of service, etc. (i.e., the value in the Allowed Service Access field 314=AllServices+Admin). Access to this exemplary tier/level of service access may be granted when the user of the access device has supplied an administrative identifier and an associated password (i.e., the value in the ID Required field 312=AdminID+PIN).

Figure 4:
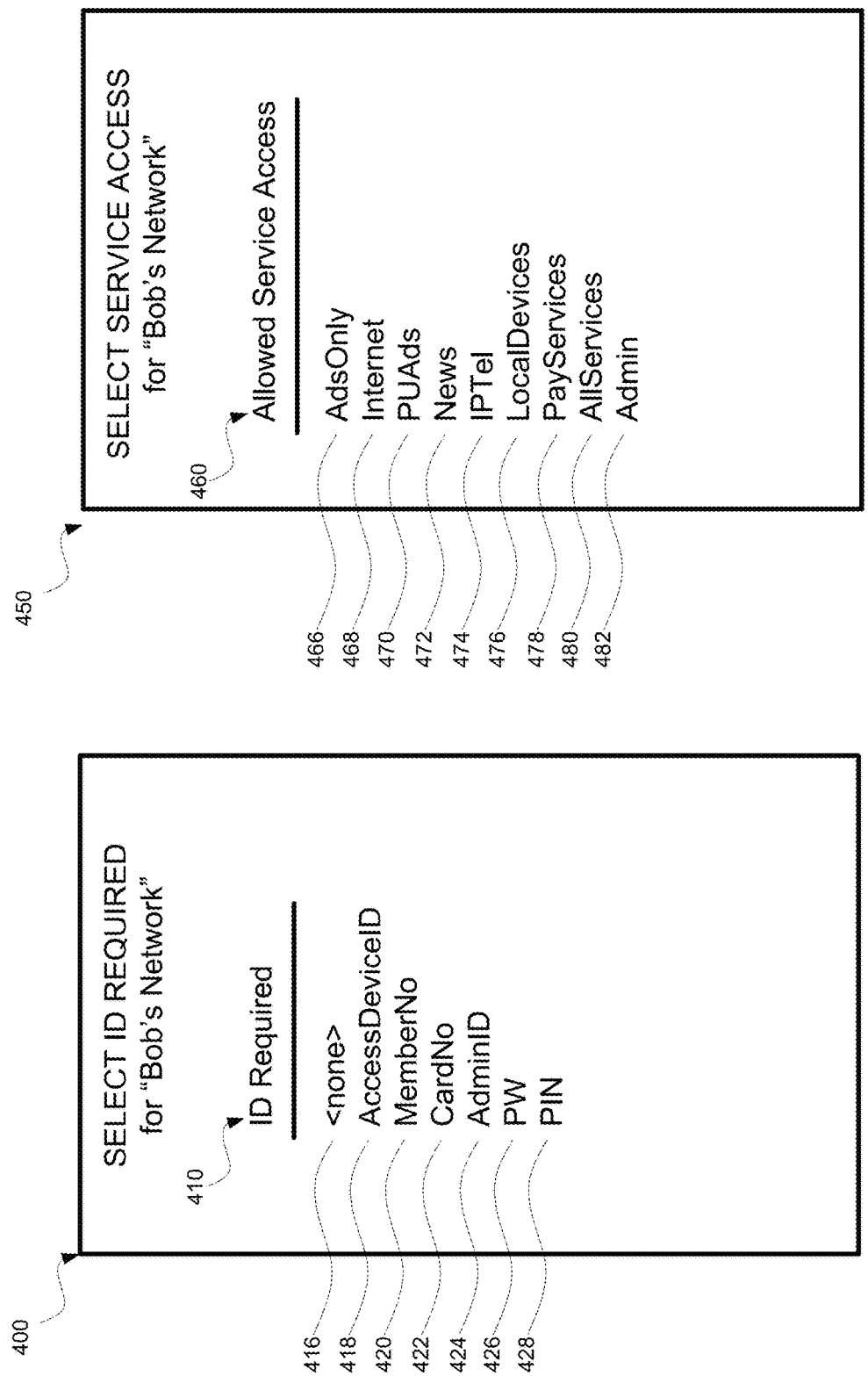
FIG. 4A shows an illustration of a menu that may, for example, be used to select the value assigned to the "ID required" field of a service tier or level in the service administration screen of FIG. 3, in accordance with a representative embodiment of the present invention.
FIG. 4B shows an illustration of a menu that may, for example, be used to select the value assigned to the "Allowed Service Access" field of a service tier or level in the service administration screen of FIG. 3, in accordance with a representative embodiment of the present invention.

FIG. 4A shows an illustration of a menu 400 that may, for example, be used to select the value assigned to the "ID required" field 312 of a service tier or level in the service administration screen 300 of FIG. 3, in accordance with a representative embodiment of the present invention. As shown in the illustration of FIG. 4A, the menu 400 may provide an administrator of a broadband access gateway such as the gateway 118 of FIG. 2 a number of choices of values 416-428 that may be selected for the ID Required field 312 of a row for a tier in screen 300 of FIG. 3.

FIG. 4B shows an illustration of a menu 450 that may, for example, be used to select the value assigned to the Allowed Service Access field 314 of a service tier or level in the service administration screen 300 of FIG. 3, in accordance with a representative embodiment of the present invention. As shown in the illustration of FIG. 4B, the menu 450 may provide an administrator of a broadband access gateway such as, the gateway 118 of FIG. 2, a number of choices of values 466-482 that may be assigned to the Allowed Service Access field 314 of a row for a tier in screen 300 of FIG. 3.

Figure 5:
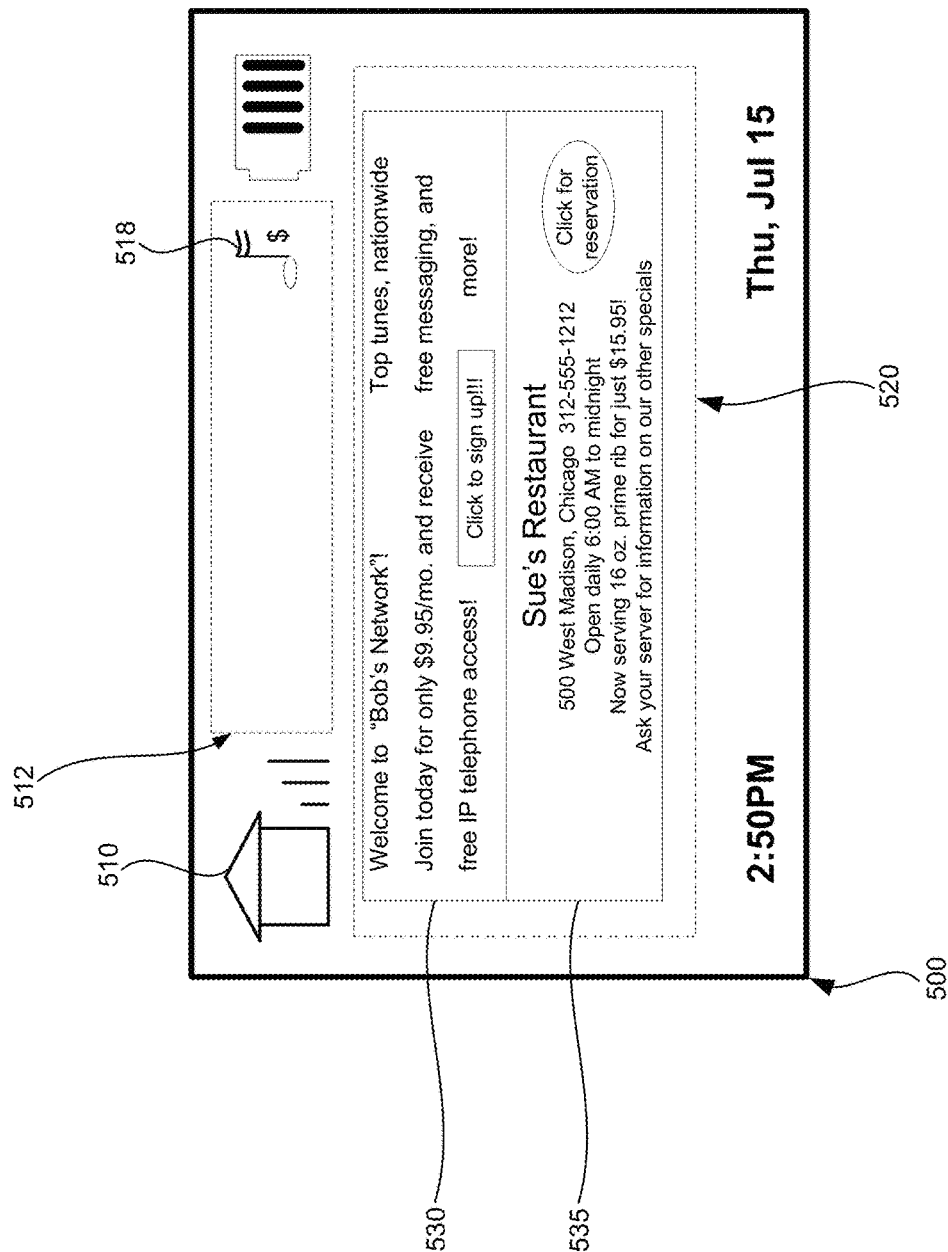
FIG. 5 shows an exemplary display of an access device that may correspond, for example, to the access device of FIG. 2, in accordance with a representative embodiment of the present invention.

FIG. 5 shows an exemplary display 500 of an access device that may correspond, for example, to the access device 124 of FIG. 2, in accordance with a representative embodiment of the present invention. The display 500 illustrates what may be visible on the display of an access device granted a tier or level of service access corresponding to the exemplary Tier 1 316 level of service access shown in FIG. 3. As shown in FIG. 5, the display 500 comprises a network indicator 510, a network services indicator area 512, a battery life indicator, a time of day indicator, and a day and date indicator. The display 500 also comprises a display area 520 to allow an access device to present graphical or textual information for a variety of reasons and from a number of sources. The visibility of network indicator 510 may represent that the access device is within the coverage area of a personal area network supported by a wireless broadband access gateway such as, for example, the gateway 118 or router 130 of FIG. 2.

As shown in FIG. 5, the network services indicator area 512 comprises a pay music service icon 518 that may be made visible based upon advertising information sent to the access device. In addition, the display area 520 comprises advertisements 530 and 535 that may also result from advertising information sent to the access device. Further details concerning the advertising of media services by a broadband access gateway may be found in U.S. patent application Ser. No. 11/021,294, entitled "Method And System For Extended Network Access Services Advertising Via A Broadband Access Gateway," filed Dec. 23, 2004, the complete subject matter of which is hereby incorporated herein by reference, in its entirety.

The display 500 may be representative of the tier/level of service access corresponding to the information of the Tier 1 316 entry of the service administration screen 300 of FIG. 3, wherein the access device may be provided only advertisements (i.e., the value in the Allowed Service Access field 314=AdsOnly). This tier may be selected when no identification is provided by the access device and known to the broadband gateway (i.e., the value in the ID Required field 312 column=<none>) at the time the access device came into communication with the broadband access gateway.

Figure 6:
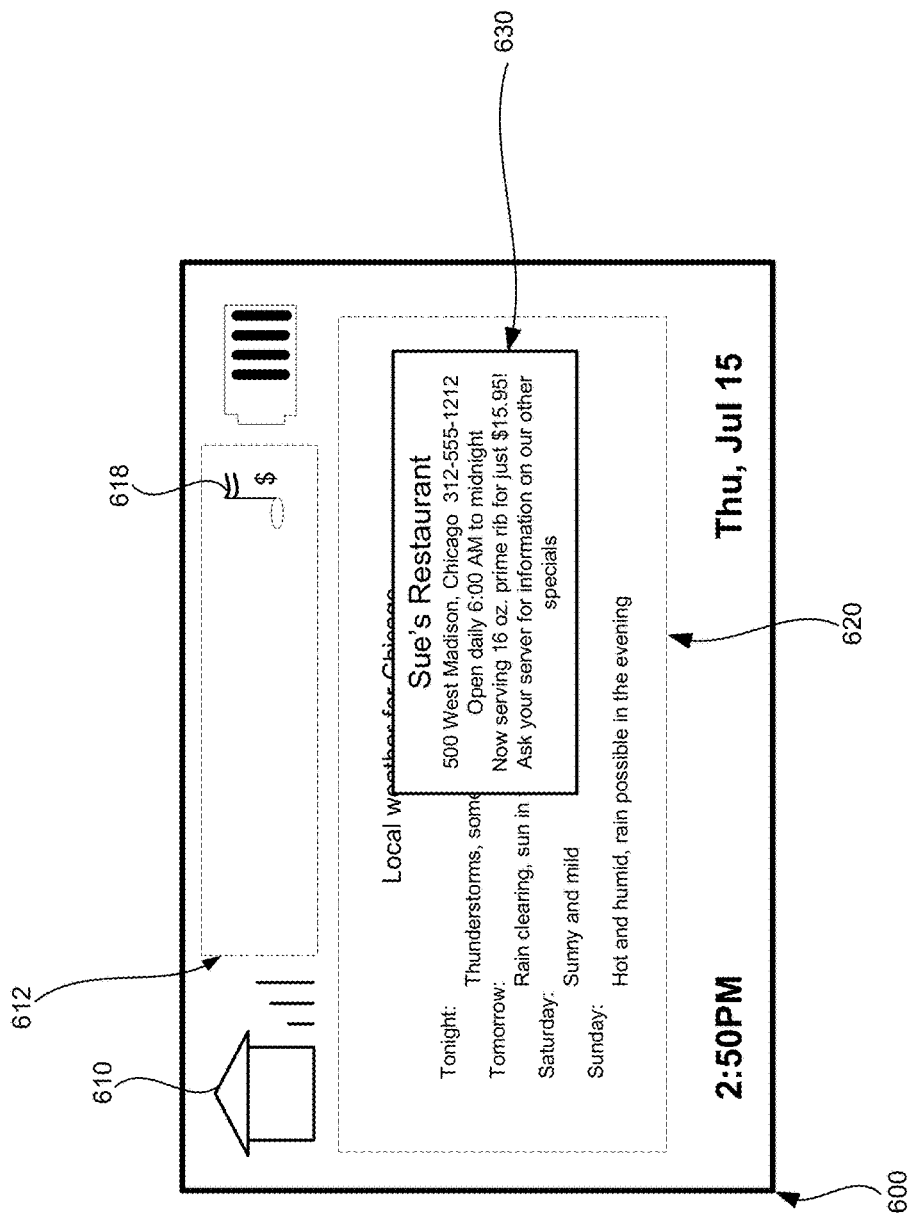
FIG. 6 shows an illustration of a exemplary display of an access device that may correspond, for example, to the access device, laptop, or wireless PDA of FIG. 2, in accordance with another representative embodiment of the present invention.

FIG. 6 shows an illustration of an exemplary display 600 of an access device that may correspond, for example, to the access device 124, laptop 117, or wireless PDA 119 of FIG. 2, in accordance with another representative embodiment of the present invention. The display 600 illustrates what may be visible on the display of an access device granted a tier or level of service access corresponding to the exemplary Tier 2 318 level of service access shown in FIG. 3.

As shown in FIG. 6, the display 600 comprises a network indicator 610, a network services indicator area 612, a battery life indicator, a time of day indicator, and a day and date indicator. The display 600 also comprises a display area 620 to allow an access device to present graphical or textual information for a variety of reasons and from a number of sources. The visibility of network indicator 610 may represent that the access device is within the coverage area of a personal area network of a wireless broadband access gateway such as, for example, the gateway 118 or router 130, of FIG. 2. As shown in the example of FIG. 6, the network services indicator area 612 comprises a pay music service icon 618 that may be made visible due to advertising information sent to the access device. In addition, the display area 620 comprises a textual listing of a local weather service accessed via the Internet, and a pop-up ad 630 representative of advertising information sent to the access device.

The display 600 may be representative of a tier/level of service access corresponding to the information of the Tier 2 318 entry of the service administration screen 300 of FIG. 3, wherein the access device may be provided with Internet service with pop-up advertisements (i.e., the value in the Allowed Service Access field 314=Internet+PUAds). In a representative embodiment of the present invention, service access at this tier may result when only an access device identifier is provided by the access device and known to the broadband gateway (i.e., the value in the ID Required field 312=AccessDeviceID) at the time the access device came into communication with the broadband access gateway.

Figure 7:
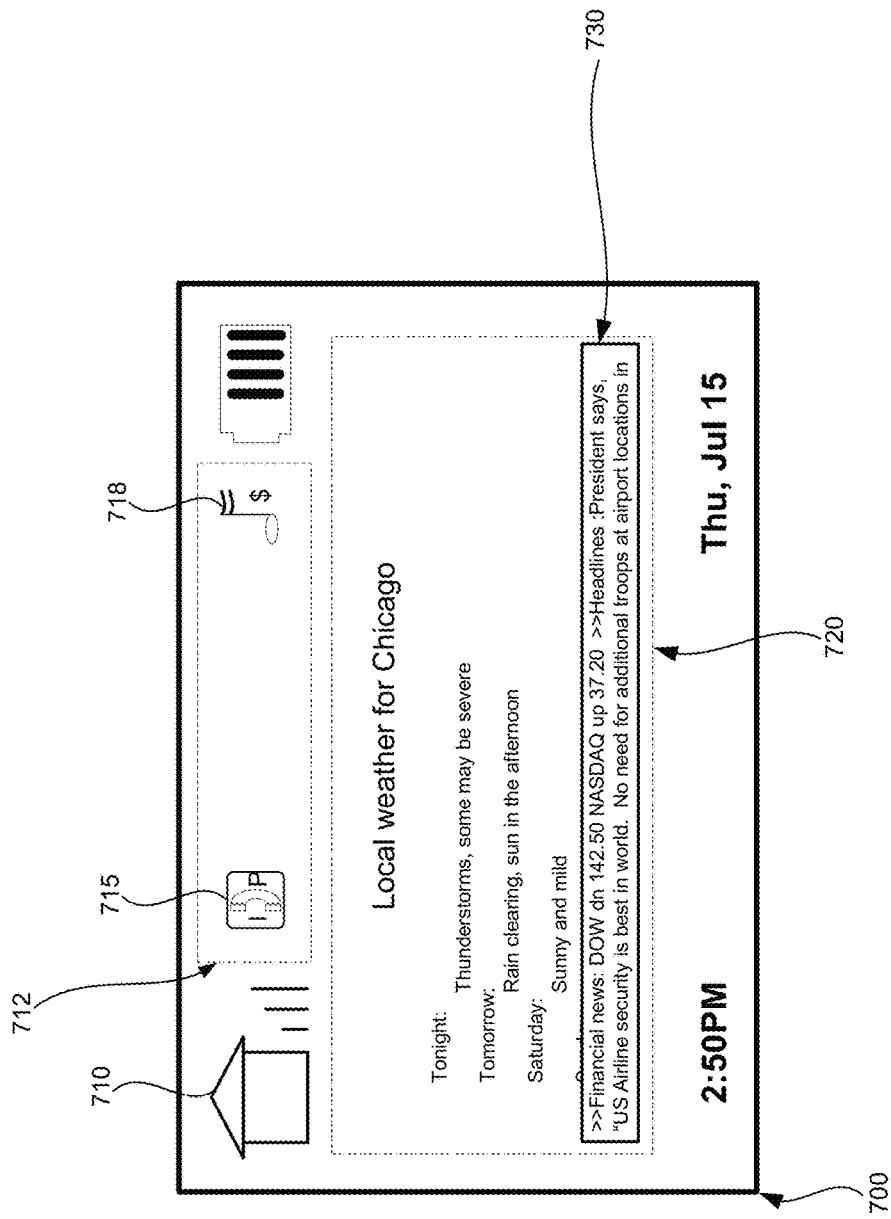
FIG. 7 shows an illustration of an exemplary display of an access device that may correspond, for example, to the access device, laptop, or wireless PDA of FIG. 2, in accordance with yet another representative embodiment of the present invention.

FIG. 7 shows an illustration of an exemplary display 700 of an access device that may correspond, for example, to the access device 124, laptop 117, or wireless PDA 119 of FIG. 2, in accordance with yet another representative embodiment of the present invention. The display 700 illustrates for those items that may be visible on the display of an access device granted a tier or level of service access corresponding to the exemplary Tier 4 318 level of service access shown in FIG. 3.

As shown in FIG. 7, the display 700 comprises a network indicator 710, a network services indicator area 712, a battery life indicator, a time of day indicator, and a day and date indicator. The display 700 also comprises a display area 720 to allow an access device to present graphical or textual information for a variety of reasons and from a number of sources. The visibility of network indicator 710 may represent that the access device is within the coverage area of a personal area network of a wireless broadband access gateway such as, for example, the gateway 118 or router 130, of FIG. 2. As shown in the example of FIG. 7, the network services indicator area 712 comprises an Internet protocol (IP) phone service icon 715 that may be displayed in response to service information sent by a broadband access gateway. The network services indicator area 712 of FIG. 7 also comprises a pay music service icon 718, that may appear based upon advertising information sent to the access device by the broadband access gateway. The display area 720 in FIG. 7 comprises a textual listing of local weather service information accessed via the Internet, and a scrolling news display 730.

The display 700 may represent a tier/level of service access corresponding to the fields of information of the Tier 4 318 entry of the service administration screen 300 of FIG. 3, wherein the access device may be provided with Internet service, news service, and Internet protocol (IP) telephony service (i.e., the value in the Allowed Service Access field 314=Internet+News+IPTel). In a representative embodiment of the present invention, service access at this tier may be provided when a member number and an associated password (i.e., the value in the "ID Required" field 312=MemberNo+PW) are shared by the access device and known to the broadband gateway at the time the access device came into communication with the broadband access gateway.

Figure 8:
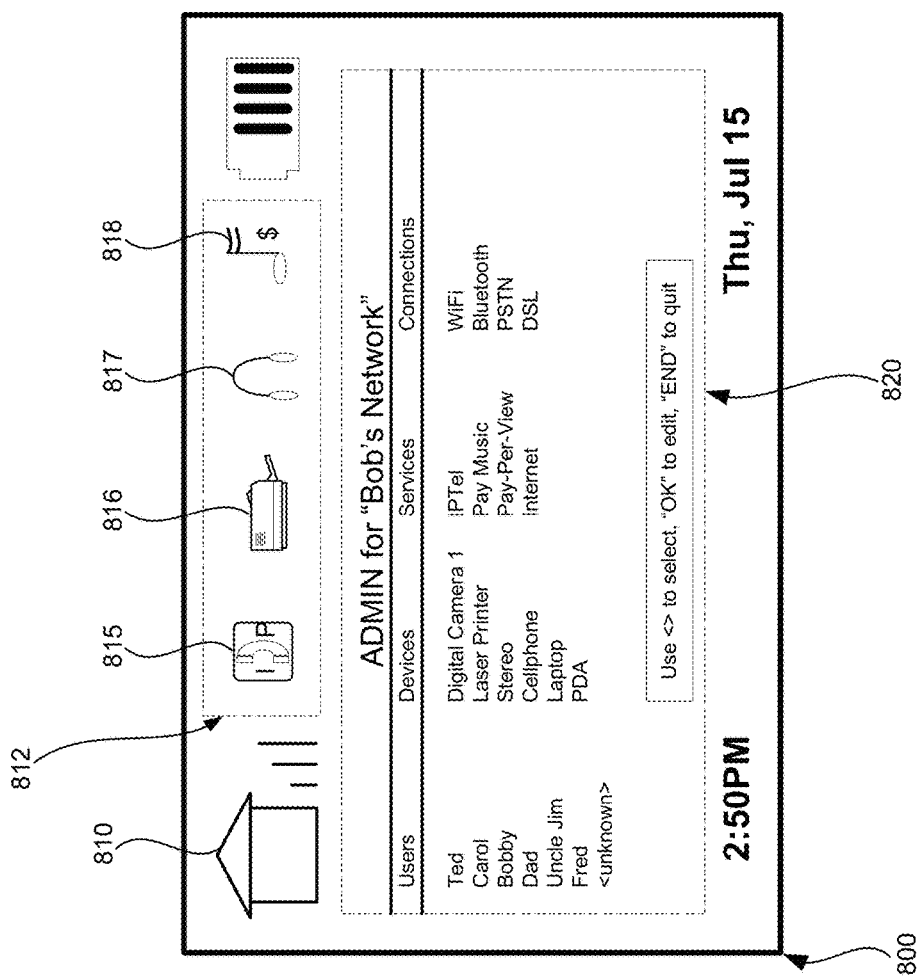
FIG. 8 shows an illustration of an exemplary display of an access device that may correspond, for example, to the access device, laptop, or wireless PDA of FIG. 2, in accordance with still another representative embodiment of the present invention.

FIG. 8 shows an illustration of an exemplary display 800 of an access device that may correspond, for example, to the access device 124, laptop 117, or wireless PDA 119 of FIG. 2, in accordance with still another representative embodiment of the present invention. The display 800 illustrates administrative information that may be visible on the display of an access device being afforded a tier or level of service access corresponding to the exemplary Tier 6 318 level of service access shown in FIG. 3. As shown in FIG. 8, the display 800 comprises a network indicator 810, a network services indicator area 812, a battery life indicator, a time of day indicator, and a day and date indicator. The display 800 also comprises a display area 820 to allow an access device to present graphical or textual information for a variety of reasons and from a number of sources. The visibility of network indicator 810 may signal that the access device is within the coverage area of a personal area network of a wireless broadband access gateway such as, for example, the gateway 118 or router 130, of FIG. 2. The network services indicator area 812 in the example of FIG. 8 comprises an Internet protocol (IP) phone service icon 815, a printer service icon 816, a stereo entertainment icon 817, and a pay music service icon 818. The icons 815-818 shown in the network services indicator area 812 may be displayed in response to service and advertising information sent by the broadband access gateway based upon information from the serving gateway.

The display area 820 of FIG. 8 comprises a tabular textual listing of administrative parameters for "Bob's Network." This arrangement is not a limitation of the present invention, and is provided for illustrative purposes only. Other arrangements for providing an administrative interface and access may also be used, without departing from the spirit of the present invention. The display 800 of FIG. 8 may represent a level of service access corresponding to the fields of information of the Tier 6 318 entry of the service administration screen 300 of FIG. 3, wherein the access device may have access to all services, and have the ability to perform administrative functions (i.e., the value in the Allowed Service Access field 314=AllServices+Admin). In a representative embodiment of the present invention, service access at this tier may be provided when an administrative identifier and an associated password are provided via the access device and known to the broadband gateway (i.e., the value in the ID Required field 312=AdminID+PW) at the time the access device came into communication with the broadband access gateway. The fields of the display area 820 may be employed by an administrative user of the gateway, for example, to establish/modify service tiers, manage user and service information, and similar administrative functions.

In a representative embodiment of the present invention, a broadband access gateway such as, for example, the gateway 118 of FIG. 2 may download new operating code, code updates, code upgrades, and/or "bug" fixes for operation of the gateway 118, via a broadband network such as, for example, the broadband connection 107 shown in FIG. 2, based upon a tier or level of registration of a user. For example, in one representative embodiment of the present invention, a broadband access gateway such as the gateway 118 may download, upgrade, and/or update operating code for the gateway 118 upon being accessed by an access device that supports services or features that are not presently supported by the gateway 118, and which are to be accessible by an authorized and authenticated user at a particular tier or level. A user of a service at the particular tier or level may not have been previously registered, and suitable software and/or firmware to support service at that registration tier may not have previously been had purpose in serving a user. A broadband access gateway in accordance with the present invention may, for example, download new, updated, and/or upgraded operating code for processing of new forms of multimedia information that may be made accessible to a user of a particular level or tier of service access. Users subscribing to various levels or tiers of service may employ a variety of access devices, each involving particular support in a gateway such as, for example, the gateway 118. This may include, for example, functionality to support the transcoding of one representation to another. Downloads of new operating code may enable the use of an access device not previously supported by the gateway 118.

A broadband access gateway in accordance with a representative embodiment of the present invention may also download new, updated, and/or upgraded operating code to an access device, to improve and/or enable the operation of features and/or services for new levels or tiers of service. For example, a broadband access gateway such as, for example, the gateway 118 of FIG. 2 may detect that an access device such as, for example, the access device 124 is not currently capable of making use of a particular new service available through the gateway 118, although the user may be registered for the particular level or tier of service access that permits use of the new service. Using identifying information received during registration, the gateway 118 may retrieve and download appropriate new, updated, and/or upgraded operating code to the access device 124, enabling the access device 124 to make use of the new service, and/or fixing errors in the present operating code. The gateway 118 may automatically request and download new and/or updated access device operating code via a broadband network such as, for example, the broadband network supported by the modem 132.

Figure 9:
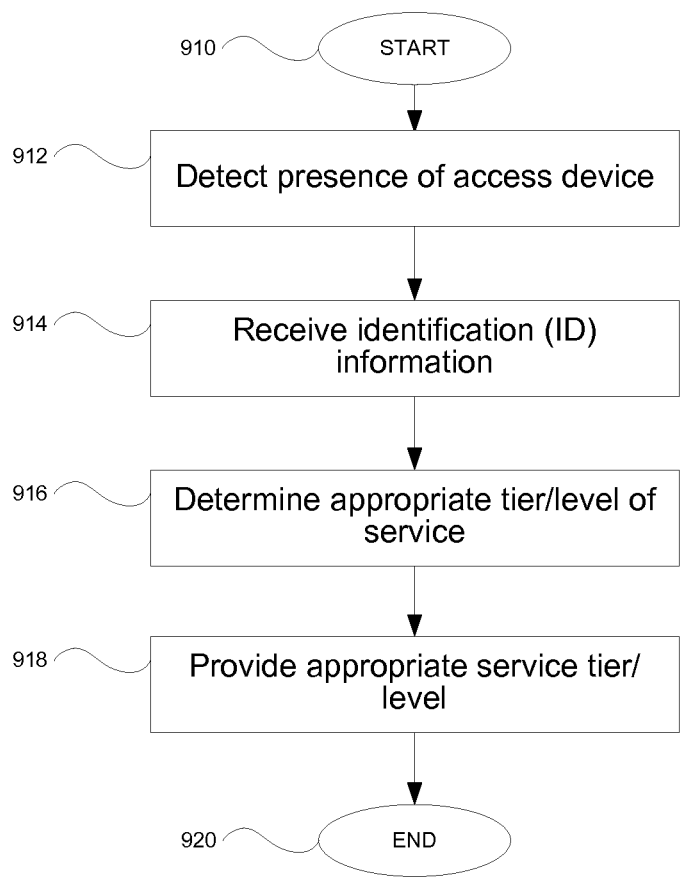
FIG. 9 is a flowchart illustrating an exemplary method of supporting access dependent services using multiple tiers or levels of access privilege, in accordance with a representative embodiment of the present invention.

FIG. 9 is a flowchart 900 illustrating an exemplary method of supporting access dependent services using multiple tiers or levels of access privilege, in accordance with a representative embodiment of the present invention. As an aid to understanding, the following discussion of FIG. 9 makes reference to the elements of FIG. 2. The method illustrated by FIG. 9 begins at a start block 910, when a wireless broadband access gateway or router such as, for example, the gateway 118 or router 130 is powered up. At some point following power-up, the gateway detects the presence of an access device with which communication may just have been established (block 912). The access device may correspond, for example, to the access device 124, the laptop 117, or the wireless PDA 119, of FIG. 2. The access device may then provide to the gateway information identifying the access device to the gateway (block 914). Such information may comprise, for example, one or more of an access device ID, a member number, an administrative ID, an electronic serial number, and a media access control (MAC) address. The access device may instead provide a digital certificate that may be used to provide anonymous access authorization to services and information available via the gateway. The gateway may then determine the tier or level of access that is to be provided to the access device (block 916). This may be based upon the information from the access device, described above, other information stored within the gateway or router, and/or information accessible to the gateway or router via any of its personal area or broadband network connections. The gateway then provides an appropriate tier or level of service to the access device (block 918). The method then ends (block 920).

Figure 10:
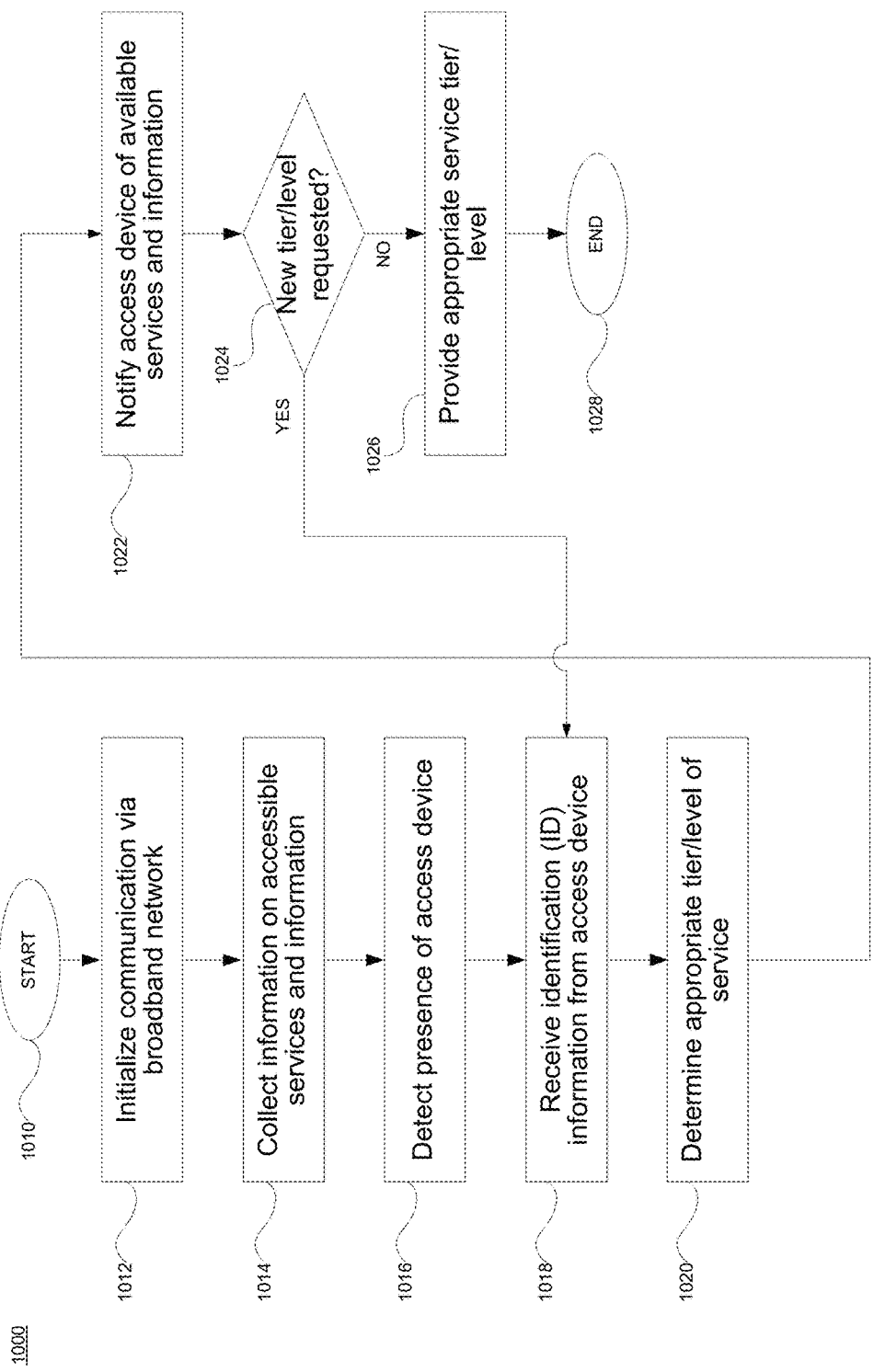
FIG. 10 shows a flowchart illustrating another exemplary method of supporting access dependent services using multiple tiers or levels of access privilege, in accordance with a representative embodiment of the present invention.

FIG. 10 shows a flowchart 1000 illustrating another exemplary method of supporting access dependent services using multiple tiers or levels of access privilege, in accordance with a representative embodiment of the present invention. To clarify the following method, references to the elements of FIG. 2 are employed. The method illustrated in FIG. 10 begins at a start block 1010, when a wireless broadband access gateway or router such as, for example, the gateway 118 or router 130 is powered up. The gateway first initializes communication via the broadband network (block 1012), and collects information on the network location of multimedia services and information sources accessible via either the broadband network, or from the access devices within the personal area network served by the gateway (block 1014). Such network location information may comprise, for example, an Internet protocol (IP) address, a media access control (MAC) address, an access device identifier, and information identifying a type of multimedia information. At some later time, the gateway detects the presence of an access device with which communication may have just been established (block 1016). The access device may correspond, for example, to the access device 124, the laptop 117, or the wireless PDA 119, of FIG. 2. The gateway may then receive identifying information provided by the access device (block 1018). Such information may comprise one or more items such as, for example, an access device ID, a member number, an administrative ID, an electronic serial number, and a media access control (MAC) address. The access device may also provide proof of authorization of service access using a digital certificate. The digital certificate may be used to provide anonymous access authorization to services and information for the user of the access device. Next, the gateway may determine the tier/level of service access that is to be provided to the access device (block 1020). This may be based upon the information from the access device, described above, other information stored within the gateway or router, and/or information accessible to the gateway or router via any of its personal area network or broadband network connections. The gateway may then notify the access device of the services and/or information sources that may be available via the gateway (block 1022), using the location information collected above (block 1014). At some later time, the user of the access device may request a new tier or level of access to services and information (block 1024). If a new tier of service access and information is requested, the gateway may receive new identification information from the access device (block 1018), and may then determine the appropriate tier/level of service access and information that should be made available to the user (block 1020). The gateway may then notify the access device of the new complement of service and information that is available (block 1022). If a new tier or level of service and information access was not requested (block 1024), the gateway may proceed to provide the appropriate level of service access based upon the supplied identification information or digital certificate (block 1026). The method of FIG. 10 then ends (block 1028).

Aspects of the present invention may be seen in a system supporting controlled access to multimedia information and media-related services. Such a system may comprise a gateway communicatively coupled to a broadband network and at least one wireless interface. The gateway may be capable of selectively exchanging multimedia information among the at least one wireless interface and the broadband network, and of communicating with a plurality of access devices via the at least one wireless interface. The gateway may be capable of selecting one of a plurality of access privilege tiers based upon identification information received from one of the plurality of access devices, and of controlling access by the one of the plurality of access devices to the multimedia information and media-related services, based upon the selected access privilege tier. The system may also comprise software supporting management of the plurality of access privilege tiers by a user, via at least one of the gateway and the broadband network.

In a representative embodiment in accordance with the present invention, the multimedia information may comprise at least one of streaming video, broadcast video, voice, digital data, text, digitized audio, digitized still images, digitized video, and digitized music. The at least one media-related service may comprise at least one of accessing, recording, playing, exchanging, transmitting, receiving, converting, and translating of multimedia information. The identification information may comprise at least one of an identifier of an access device, a user identifier, a member identifier, an electronic serial number, a media access control (MAC) address, an administrative identifier, a password, a commercial credit card number, a personal identification number, and a digital certificate. The at least one wireless interface may be compliant with the Bluetooth V1.2 or compatible personal area network (PAN) specification, and may be compliant with at least one of the Institute of Electrical and Electronics Engineers (IEEE) 802.11a, 802.11b, 802.11g, and 802.11n standards. In addition, the at least one wireless interface may communicate using an unlicensed frequency band, and may communicate at a frequency of approximately 2.4 gigahertz.

In various representative embodiments of the present invention, the broadband network may comprise at least one of a digital subscriber line (DSL) network, a cable network, a satellite network, a cellular network, and the Internet. The cellular network may comprise at least one of a global system for mobile communications (GSM) network, a time division multiple access (TDMA) network, a code division multiple access (CDMA) network, and a universal mobile telecommunications system (UMTS) network. The gateway may collect network location information of at least one of multimedia information and media-related services for at least one of the plurality of access devices and the broadband network. In various representative embodiments in accordance with the present invention, the network location information may comprise at least one of an Internet protocol (IP) address, a media access control (MAC) address, an access device identifier, and information identifying a type of multimedia information. The gateway may use the collected network access information to make available to the user the at least one of multimedia information and media-related services. The plurality of access devices may comprise at least one of a mobile multimedia handset, a personal digital assistant (PDA), a personal computer (PC), a digital scanner, a digital camera, a printer, headphones, and a pointing device.

An additional aspect of the present invention may be observed in a method supporting controlled access to multimedia information and media-related services by a plurality of access devices. Such a method may comprise detecting, via one of a personal area network and a wireless local area network, the presence of one of the plurality of access devices, and receiving identification information from the detected access device. The method may select one of a plurality of access privilege tiers based upon the identification information, and provide to the detected access device, access to at least one of multimedia information and media related services based upon the selected access privilege tier. A representative embodiment of the present invention may also comprise collecting network location information of at least one of multimedia information and media-related services for at least one of the plurality of access devices and the broadband network. The network location information may comprise at least one of an Internet protocol (IP) address, a media access control (MAC) address, an access device identifier, and information identifying a type of multimedia information, and the providing may use the collected network access information to make available to the detected access device, the at least one of multimedia information and media-related services.

In a representative embodiment of the present invention, the personal area network may be compliant with the Bluetooth V1.2 or compatible personal area network (PAN) specification. The personal area network may communicate using an unlicensed frequency band, and may communicate at a frequency of approximately 2.4 gigahertz. The wireless local area network may be compliant with at least one of the Institute of Electrical and Electronics Engineers (IEEE) 802.11a, 802.11b, 802.11g, and 802.11n standards. The broadband network in various representative embodiments of the present invention may comprise at least one of a digital subscriber line (DSL) network, a cable network, a satellite network, a cellular network, and the Internet. The cellular network may comprise at least one of a global system for mobile communications (GSM) network, a time division multiple access (TDMA) network, a code division multiple access (CDMA) network, and a universal mobile telecommunications system (UMTS) network. The multimedia information may comprise at least one of streaming video, broadcast video, voice, digital data, text, digitized audio, digitized still images, digitized video, and digitized music. The plurality of access devices may comprise at least one of a mobile multimedia handset, a personal digital assistant (PDA), a personal computer (PC), a digital scanner, a digital camera, a printer, headphones, and a pointing device.

Yet other aspects of the present invention may be found in a machine-readable storage, having stored thereon a computer program having a plurality of code sections for execution by a machine for causing the machine to perform the above operations.

In a representative embodiment of the present invention, the wireless local area networks may include data networks such as, for example, Institute of Electrical and Electronics Engineer (IEEE) 802.11a/b/g/n compliant wireless networks such as those located in homes, hot spots or an office. Such local area networks may operate in unlicensed radio frequency spectrum such as in, for example, the 2.4 and 5 gigahertz regions. Examples of wide area networks may include cellular digital packet data (CDPD), voice and data networks such as public switched telephone networks (PSTN), Global System For Mobile Communication (GSM), GSM General Packet Radio Service (GPRS), GSM Short Message Service (SMS), GSM Enhanced Data Rates For Global Evolution (EDGE), North American Time Division Multiplex Access (TDMA), iDEN, Code Division Multiple Access (CDMA) and CDMA2000 1×RT, Universal Mobile Telecommunications System (UMTS) network, to name only a few.

A personal area network (PAN) may be formed by a plurality of wireless communication access devices such as, for example, mobile multimedia handsets, PDAs, telephones, and computers. Other elements of such a network may, for example, include computer peripherals such as digital scanners, digital cameras, printers, headphones, and pointing devices, that may be located within the immediate proximity of a person. A PAN may be an ad-hoc network of such communication devices. In a representative embodiment of the present invention, access devices within the PAN may communicate with other access devices within the PAN and also with other access devices that are located in other networks accessible via the PAN. The personal area networks may include data networks such as, for example, a Bluetooth compliant network, and Institute of Electrical and Electronics Engineer (IEEE) 802.15.3a compliant wireless networks. Such personal area networks may operate in unlicensed radio frequency spectrum such as, for example, the 2.4 and 5 gigahertz regions. Details of one example of a personal area network are provided in the document "Bluetooth Core Specification V1.2", Nov. 5, 2003, from Bluetooth SIG, Inc., the complete subject matter of which is hereby incorporated herein by reference, in its entirety. For example, in a Bluetooth® wireless PAN, a first Bluetooth®-enabled wireless access device may communicate with a second Bluetooth®-enabled wireless access device within the PAN. Additionally, either of the first and second Bluetooth®-enabled wireless access devices may communicate with the Internet or another LAN or WAN via the Bluetooth® wireless PAN.

In a representative embodiment of the present invention, a gateway may be adapted to provide seamless and transparent communication between a plurality of access devices and a plurality of networks. The functionality of the gateway may be divided, for example, into application content functionality, and configuration and management functionality. The application content functionality may, for example, deal with the types of applications that may be supported by the gateway as well as the various types of data that may be received, processed and/or transmitted by the gateway. In this regard, application content functionality may also include the manner in which other devices and/or systems may utilize data from the gateway.

Content and application services are important because all the information coming into and leaving the home from either the WAN side (i.e., the broadband connection side), or from the PAN side (i.e., the access device side) converges at the gateway. The PAN side may comprise Bluetooth, wireless LAN (IEEE 802.11a/b/g/n), IEEE 802.15.3a ultra-wideband, or cellular, for example. Notwithstanding, the gateway may be adapted to convert, for example, wirelessly received GSM-formatted information into, for example, Internet protocol (IP)-formatted information and in reverse, converts IP-formatted information into wireless GSM-formatted information suitable for over-the-air transmission. Support for other wireless communication protocols such as TDMA, CDMA, and UMTS may also be provided. In a representative embodiment of the present invention, the gateway may comprise suitable circuitry, logic and/or code that may be adapted to receive and process MPEG related data, which may be suitable for display on a screen. The gateway in an embodiment of the present invention functions as a focal point where data converges from a plurality of wired and wireless services. Although, in a particular embodiment of the present invention the gateway may do very little in terms of actual content aggregation, there is virtual aggregation of data. The converged data may be integrated and or otherwise utilized to offer unique opportunities for launching various content and application services from a single strategic location. Since the gateway in an embodiment of the present invention is the focal point where data converges, one or more protocol stacks may be employed for launching the various content and application services.

The gateway in a representative embodiment of the present invention may be adapted to route calls based on established rules that may be programmed into the gateway. For example, the gateway may be governed by a rule which states that local calls are to be routed to an incumbent local exchange carrier (iLEC), while long distance calls are to be handled by Long Distance Carrier Company. Accordingly, when a call originates at the gateway and it is determined that the call is a local call, the gateway may be adapted to route the call to the iLEC. However, if the gateway determines that the call is a long distance call, then the gateway may be adapted to route the call to Long Distance Carrier Company.

A representative embodiment of the present invention may leverage existing broadband infrastructure that is commonly found in many homes and businesses today. Because a consumer is already paying for the use of the broadband infrastructure in their home or office, leveraging the use of the existing broadband infrastructure for communication with wide area networks results in minimal or no communication costs. The broadband infrastructure may be, for example, a cable or DSL infrastructure.

The wireless interface function provided by the gateway located within a home, for example, may be utilized to route or communicate a great deal of traffic to a wired network such as a broadband network or a wireless network such as a GSM or CDMA network via a broadband connection. In other words, the wireless gateway infrastructure provided by a representative embodiment of the present invention provides a scalable network infrastructure that rides on an existing access infrastructure already supplied by a broadband service provider to a home, office or business. Additionally, the scalable infrastructure provided by the gateway also solves the problems associated with signal penetration and propagation, thereby providing improved quality of service (QoS). From a market perspective, a wireless service provider may now have access to the necessary infrastructure to provide improved wireless services to users within a home or office. Accordingly, in order to rapidly increase their growth, wireless service providers may now target that portion of the in-home landline or plain old telephone system (POTS) business, which have traditionally been handled by incumbent local exchange carriers (ILECs) or other LECs.

The unlicensed mobile access gateway described above may possess a significant amount of processing power. The gateways of existing systems fall short of realizing the full potential of the merged wired and wireless communication network that is enabled by a representative embodiment of the present invention. Numerous basic and enhanced communication services may be enabled or provided by the gateway. Support for access devices such as, for example, mobile multimedia handsets and PDAs may be involved in order to utilize these basic and enhanced communication services enabled by the new wave of digital technologies. Current and/or proposed mobile access gateway systems, however, do not provide the range of support needed for their use by the everyday consumer.

The present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
    at a gateway configured to communicate data between a broadband modem which is configured for communication with a broadband network and a wireless communication interface which is configured for communication over a wireless network with wireless devices in a coverage area,
    receiving, from a gateway administrator, tier definition information about respective service tiers of a plurality of service tiers available to the wireless devices in the coverage area;
    storing the tier definition information in memory for subsequent access;
    receiving, from the gateway administrator, tier access information about identification or authentication information required for access over the gateway to each respective service tier of the plurality of service tiers, the identification or authentication information being different for each respective service access tier and the identification or authentication information for each respective service access tier comprising at least one of a plurality of different identifier types or one of a plurality of different password types;
    storing the tier access information in the memory for subsequent access;
    receiving content information about multimedia information or media-related services, or both, available to the wireless devices over the wireless network;
    storing the content information in the memory for subsequent use;
    communicating tier assignment information to at least one of the wireless devices, the tier assignment information corresponding to one of the plurality of service tiers that is assigned to the at least one of the wireless devices, wherein the tier assignment information identifies the multimedia information or media-related services accessible by the at least one of the wireless devices; and
    subsequently, controlling access by one or more of the wireless devices to the multimedia information or media-related services using the stored tier definition information, tier access information and content information.

2. The method of claim 1 wherein controlling access comprises:
    at the gateway, receiving identification information from a wireless device of the one or more wireless devices seeking to access the multimedia information or media-related services through the gateway;
    using the received identification information and the stored tier access information, determining a permitted tier for the wireless device of the plurality of service tiers; and
    at the gateway, providing to the wireless device requested multimedia information or media-related services.

3. The method of claim 2 wherein providing requested multimedia information comprises:
    at the gateway, receiving from the wireless device a request for multimedia information or media-related services to be provided over the wireless network;
    using the permitted tier for the wireless device and the tier definition information about the respective service tiers, determining if the wireless device is authorized for access to the requested multimedia information or media-related services;
    if the wireless device is authorized, providing the requested multimedia information or media-related services to the wireless device over the wireless network; and
    if the wireless device is not authorized, providing a minimal level of services to the wireless device over the wireless network.

4. The method of claim 2 further comprising:
    receiving an access communication from the wireless device, the access communication omitting identification information for the wireless device; and
    in response to omitted identification information, providing a minimal level of services to the wireless device over the wireless network.

5. The method of claim 4 wherein providing the minimal level of services to the wireless device comprises providing network signup information and advertisements over the wireless network to the wireless device.

6. The method of claim 1 wherein receiving, from the gateway administrator, the tier definition information about a respective service tier of the plurality of service tiers comprises:
    associating tier identifier data with corresponding required identification or authentication information required for access to the respective service tier and with corresponding tier content information for tier content multimedia information or media-related services, or both, available at the respective service tier, wherein the identification or authentication information required to access a first service tier of the plurality of service tiers comprises a first identifier type of the plurality of different identifiers types without a password, and the identification or authentication information required to access a second service tier of the plurality of service tiers comprises the first identifier type of the plurality of different identifier types with one of the plurality of different password types.

7. The method of claim 1 further comprising:
    at the gateway, receiving, over the wireless network, information about the multimedia information or media-related services, or both, available to the wireless devices over the wireless network along with respective location information for respective content items of the multimedia information or media-related services, the location information defining a location for access of the respective content items; and
    storing the location information for subsequent use.

8. The method of claim 7 further comprising:
at the gateway, receiving a content access request from a wireless device;
from the content access request, determining a permitted tier for the wireless device using the stored tier access information;
from the location information, determining a location on the broadband network for requested multimedia information or media-related services; and
providing the location to the wireless device.

9. A communication system comprising:
communication circuitry configured to communicate with a local wireless network, including one or more access devices, and a broadband network; and
gateway circuitry configured to communicate with the communication circuitry, the gateway circuitry further configured to:
receive data defining respective service tiers of a plurality of service tiers by which wireless devices on the local wireless network can access multimedia information or media-related services;
receive data about multimedia information or media-related services, or both, available to the wireless devices over the local wireless network, including locations on the broadband network at which the multimedia information or media-related services may be accessed;
communicate tier assignment information to at least one of the wireless devices, the tier assignment information corresponding to the respective service tier assigned to the at least one of the wireless devices, wherein the tier assignment information identifies authorized multimedia information or media-related services accessible by the at least one of the wireless devices; and
limit access by respective wireless devices to the respective service tiers in accordance with identification information for the respective wireless devices.

10. The communication system of claim 9 wherein the gateway circuitry is further configured to: comprises:
produce on a display device of an administrator a screen display including respective identification information for respective wireless devices and assigned respective service tier information for the respective wireless devices.

11. The communication system of claim 10 wherein the gateway circuitry is further configured to produce on the display device of the administrator the screen display with respective allowed service access information for the respective wireless devices, the respective allowed service access information defining one or more types of multimedia information or media-related services accessible by the respective wireless device.

12. The communication system of claim 11 wherein the gateway circuitry is further configured to produce on the display device of the administrator a screen display with a data entry selector operative for assignment by the administrator of one or more types of multimedia information or media-related services accessible by the respective wireless device according to identifying information for the respective wireless device.

13. The communication system of claim 11 wherein the gateway circuitry is further configured to produce on the display device of the administrator a screen display with a plurality of data records corresponding to a like plurality of wireless devices in the local wireless network, each data record of the plurality of data records including a plurality of data entry fields adapted for data entry by the administrator to establish and modify service tiers for the plurality of wireless devices.

14. The communication system of claim 9, wherein the gateway circuitry is further configured to:
receive identification information from the at least one of the wireless devices over the local wireless network; and
determine an assigned service tier among the plurality of service tiers for the at least one of the wireless devices responsive to the received identification information.

15. The communication system of claim 14, wherein the gateway circuitry is further configured to receive one or more of a wireless device identifier, a member number, an administrative identifier, an electronic serial number or a media access control address.

16. A method comprising:
at a gateway device configured to communicate data between a broadband modem which is configured for communication with a broadband network and a wireless communication interface which is configured for communication over a wireless network with wireless devices in a coverage area, including:
communicating, for display on a display screen of a device of an administrator, textual or graphical information about respective service access tiers of a plurality of service access tiers available to wireless devices communicating with the gateway device, and, for each respective service access tier, a respective service access allowed for the respective service access tier and respective authentication information required from a wireless device seeking to access the respective service access tier, the respective authentication information being a different type of authentication information for each respective service access tier and the different type of authentication information for each respective service access tier comprising at least one of a plurality of identifier types or one of a plurality of password types;
receiving, at the gateway device data from the device of the administrator, the data indicating the respective service access allowed for one of the plurality of service access tiers and at least one of the plurality of identifier types or one of the plurality of password types corresponding to the respective authentication information for the one of the plurality of service access tiers; and
communicating tier assignment information to at least one of the wireless devices, the tier assignment information corresponding to one of the plurality of service access tiers that is assigned to the at least one of the wireless devices, wherein the tier assignment information identifies multimedia information or media-related services accessible by the at least one of the wireless devices.

17. The method of claim 16 further comprising:
receiving, over one of the broadband network and the wireless network, at the gateway device, a service access request from the at least one of the wireless devices seeking access to multimedia information or media-related services, or both, available to the wireless devices in communication with the gateway device; and
using data from the service access request, determining the tier assignment information corresponding to the one of the plurality of service tiers that was previously assigned to the at least one of the wireless devices by the administrator of the gateway device.

* * * * *